(12) United States Patent
Buttgenbach et al.

(10) Patent No.: US 12,119,646 B2
(45) Date of Patent: Oct. 15, 2024

(54) SYSTEMS AND METHODS FOR RENEWABLE POWERPLANT SERVING MULTIPLE LOADS

(71) Applicant: 8ME NOVA, LLC, San Francisco, CA (US)

(72) Inventors: Thomas Buttgenbach, Santa Monica, CA (US); Lukas Mercer Hansen, El Dorado Hills, CA (US); Gautham Ramesh, Emeryville, CA (US); Finbar Sheehy, San Francisco, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 269 days.

(21) Appl. No.: 17/668,258

(22) Filed: Feb. 9, 2022

(65) Prior Publication Data
US 2023/0129279 A1 Apr. 27, 2023

Related U.S. Application Data

(60) Provisional application No. 63/270,149, filed on Oct. 21, 2021.

(51) Int. Cl.
*H02J 3/00* (2006.01)
*H02J 3/38* (2006.01)

(52) U.S. Cl.
CPC ............... *H02J 3/003* (2020.01); *H02J 3/38* (2013.01); *H02J 2310/16* (2020.01)

(58) Field of Classification Search
CPC .......... H02J 3/003; H02J 3/38; H02J 2310/16; H02J 15/008; H02J 2300/20; H02J 3/004; H02J 3/28

USPC .......................................................... 307/18
See application file for complete search history.

(56) References Cited

U.S. PATENT DOCUMENTS

| | | | |
|---|---|---|---|
| 8,427,098 B2 | 4/2013 | Moore et al. | |
| 8,866,334 B2 | 10/2014 | Donnelly et al. | |
| 9,559,521 B1* | 1/2017 | King | H02J 9/06 |
| 11,081,887 B1 | 8/2021 | Buttgenbach et al. | |
| 2013/0096728 A1* | 4/2013 | Steffes | H02J 3/32 |
| | | | 700/291 |
| 2014/0142776 A1 | 5/2014 | Nielsen et al. | |
| 2014/0142779 A1 | 5/2014 | Stoettrup et al. | |
| 2014/0222237 A1* | 8/2014 | Hibiya | H02J 3/381 |
| | | | 700/295 |

(Continued)

OTHER PUBLICATIONS

PCT International Prelim. Report on Patentability and Written Opinion dated May 2, 2024 in International Application No. PCT/US2022/046703.

*Primary Examiner* — Richard Tan
(74) *Attorney, Agent, or Firm* — Foley & Lardner LLP

(57) ABSTRACT

The present disclosure provides systems and methods for serving two or more uncorrelated loads connected to a renewable energy powerplant. The uncorrelated loads comprise a power grid and one or more industrial processes. A system may comprise a renewable energy system (RES), an energy storage system (ESS), and a controller programmed to: discretize an upcoming forecast horizon into a plurality of time periods; calculate one or more metrics for sending energy generated by the first RES to: (1) the ESS, (2) the power grid, and (3) the one or more industrial processes; prioritize the: (1) ESS, (2) power grid, and (3) one or more industrial processes.

25 Claims, 6 Drawing Sheets

(56) References Cited

U.S. PATENT DOCUMENTS

| | | |
|---|---|---|
| 2015/0364919 A1 | 12/2015 | Schumer et al. |
| 2019/0326754 A1 | 10/2019 | Takahashi et al. |
| 2020/0395761 A1* | 12/2020 | Walsh ................. G05B 19/042 |
| 2022/0255323 A1 | 8/2022 | Mendizabal Abasolo et al. |

* cited by examiner

SYSTEMS AND METHODS FOR RENEWABLE POWERPLANT SERVING MULTIPLE LOADS

CROSS-REFERENCE TO RELATED APPLICATIONS

This application claims the benefit of priority to U.S. Provisional Application No. 63/270,149, filed Oct. 21, 2021, the entirety of which is incorporated by reference herein.

BACKGROUND

Renewable energy may be produced in a variety of ways, such as by solar powerplants, wind turbines, geothermal powerplants, hydroelectric powerplants, and various others. The power output of the renewable energy sources (RESs) may vary in a predictable manner and/or a random manner. For example, solar power production may have seasonal and daily cycles according to the seasons and the passage of the sun across the sky, as well as certain random patterns influenced by the passage of clouds between the solar array and the sun. In the example of wind power production, it may have different seasonal and daily patterns as well as a random component influenced by the passage of weather patterns. There may be times when a renewable energy source (RES) is producing excess amounts of energy relative to the demands of the electrical load, and other times when the RES is not able to meet the demand.

One type of technique used today is to install an energy storage system (ESS) that can absorb energy when the RES's production exceeds the demands of the electrical load, and then deliver energy into the grid when the RES's production is short of the demands of the electrical load. In some cases, the ESS may be charged by the RES when the value of delivering power to the electrical load is relatively low (e.g., excessive production), and may be discharged to supplement any output of the RES when the value of delivering power to the electrical load is relatively high, while remaining within the various power limits of the connection to the electrical load and power limits of the equipment in the RES and ESS.

In addition to charging the ESS, or supplying energy to the electrical grid, the renewable energy sources (RESs) may also be used to serve other types of electric loads or energy-consuming process that may or may not be off-grid. For example, the RESs may provide energy directly to a load such as an industrial process (e.g., production of "green" hydrogen, production of ammonia, metal smelting, cryptocurrency mining, "vertical" farming, powering server farms, water purification and glass production, etc.), without passing through the electrical grid (i.e., off-grid load).

However, the multiple types of electrical loads or industrial processes connected to the RESs may not be correlated where the value of directing power to one or more of the electrical loads may vary over time, and such variations may not be correlated to one another. Therefore, there exists a need to manage and improve the allocation of the amount of energy and power amongst the multiple uncorrelated loads.

SUMMARY

The present disclosure provides systems and methods for serving multiple electric loads with renewable electrical power. In particular, energy may be allocated among multiple electric loads that may not be correlated. In some cases, the multiple electric loads may be uncorrelated or partially correlated. Electric loads or energy consuming processes that are not correlated or partially correlated may generally mean that the values of directing power to the electrical loads or the use of energy are not completely correlated to each other. For instance, the value of directing power to at least one of the electrical loads may vary over time and such variance may be at least partially independent of the value of directing power to another electrical load.

The multiple electric loads may comprise one or more grid loads or energy-consuming processes (e.g., electric load connected through an electrical grid, the electrical grid, etc.), one or more off-grid loads or industrial processes (e.g., electrical loads or energy-consuming process directly connected to the energy source, etc.). In some cases, the electric loads may include, for example, industrial processes such as production of "green" hydrogen or "green" ammonia, metal smelting, cryptocurrency mining, "vertical" farming, powering server farms, water purification and glass production and various others that may be directly connected to the renewable energy source (RES) powerplant or through the grid. For example, the production of green hydrogen may include separating water into hydrogen and oxygen through electrolysis, which requires electrical power. When the electrical power is supplied by renewable energy, the produced hydrogen is green hydrogen (i.e., no carbon dioxide ($CO_2$)—a greenhouse gas—is emitted or produced in the production of the hydrogen). In some cases, one or more processes that can consume large amounts of electrical energy may be served by the renewable energy directly without passing through the electrical grid. This may be advantageous because it may avoid paying grid charges to transport the energy. For processes that consume large amounts of energy, grid charges can be a significant cost.

In some embodiments of the present disclosure, the system may be a renewable energy system-electricity storage system (RES-ESS) powerplant. The system may comprise a renewable energy system configured to generate electrical power from a renewable energy source (RES). For example, the RES may be a solar photovoltaic (PV) array comprising solar cells or a wind farm comprising wind turbines. The system may comprise an energy storage system (ESS) configured to store energy from the RES. In some cases, the ESS may be a battery energy storage system (BESS). In some cases, the system may comprise an energy management system (EMS) configured to direct electrical power from the RES to one or more electric loads, from the RES to the ESS, or from the ESS to the one or more electric loads.

Methods and algorithms herein may be used for determining or optimizing the allocation of energy generated by the RES. In such cases, the energy storage system (ESS) may be taken into account as an electric load along with other electric loads and energy generated by the RES may be allocated among the electric loads and the ESS. Alternatively, the methods herein may be used to allocate power generated by the RES-ESS powerplant. In such case, the ESS is part of the RES-ESS and energy is allocated among the electric loads not including the ESS. The EMS may implement methods or algorithms to determine the delivery of power among multiple uncorrelated or partially correlated electric loads. In some embodiments, the methods and algorithms may flexibly adjust the amount of power: a) sent to/drawn from the ESS and b) sent to each of the electrical loads over time, allowing for economically valuable opportunities. This may beneficially allow for an improved power allocation among multiple not (completely) correlated loads and optimizing the total value for delivering the power to the multiple loads (e.g., electric grid, BESS, green hydrogen, crypto mining, etc.).

The present disclosure provides systems and methods for serving two or more uncorrelated loads connected to a renewable energy powerplant. The uncorrelated loads comprise a power grid and one or more industrial processes. A system may comprise a renewable energy system (RES), an energy storage system (ESS), and a controller programmed to: divide an upcoming forecast horizon into a plurality of time periods; calculate one or more metrics for sending energy generated by the first RES to: (1) the ESS, (2) the power grid, and (3) the one or more industrial processes; prioritize the: (1) ESS, (2) power grid, and (3) one or more industrial processes; forecast a total energy generation by the first RES for the forecast horizon; and deliver power generated by the first RES to the: (1) ESS, (2) power grid, and (3) one or more industrial processes based on the prioritization. The one or more metrics may comprise an opportunity cost (e.g., price) associated with the ESS, the power grid, and/or (3) the one or more industrial processes. The prioritization may be based on one or more of: (1) the opportunity cost, (2) a state of charge of the ESS during the forecast horizon, (3) energy requirements of the power grid during the forecast horizon, or (4) energy requirements of the one or more industrial processes during the forecast horizon.

In an aspect, a system is provided for serving two or more uncorrelated loads connected to a renewable energy powerplant. The two or more uncorrelated loads comprise a power grid and one or more industrial processes. The system may comprise: a) a first renewable energy system (RES) configured to generate electrical power from a renewable energy source; b) an energy storage system (ESS) configured to store energy from the first RES or the power grid; c) a controller communicatively coupled to the first RES, ESS, the power grid, and the one or more industrial processes, and the controller is programmed to: determine one or more metrics for different time periods of a forecast horizon, and the one or more metrics relate to sending energy generated by the first RES to: (1) the ESS, (2) the power grid, and (3) the one or more industrial processes; prioritize the: (1) ESS, (2) power grid, and (3) one or more industrial processes, and the prioritization is based on one or more of: (1) the one or more metrics determined in (c)(ii), (2) a state of charge of the ESS during the forecast horizon, (3) one or more limits/constraints related to energy or power requirements of the power grid during the forecast horizon, and (4) one or more limits/constraints related to energy or power requirements of the one or more industrial processes during the forecast horizon; and deliver power generated by the first RES to at least one of the: (1) ESS, (2) power grid, and (3) one or more industrial processes based on the prioritization.

In some embodiments, the controller is programmed to forecast a total energy generation by the first RES for a time period selected from a plurality of time periods. In some cases, the controller is further configured to determine the power to be delivered to the ESS, power grid or one or more industrial processes based on the forecasted total energy generation by the first RES.

In some instances, the system further comprises a second RES. In some case, the ESS is configured to be charged by the second RES. In some cases, the controller is communicatively coupled to the second RES, and the controller is further configured to: deliver power generated by the second RES to the: (1) ESS, (2) power grid, and (3) one or more industrial processes based on the prioritization in (c)(iii). In some cases, the controller is configured to forecast a total energy generation by the second RES for a time period selected from a plurality of time periods. In some instances, the controller is further configured to determine the power to be delivered to the ESS, power grid or one or more industrial processes based on the forecasted total energy generation by the second RES.

In some embodiments, the prioritization is performed for each time period in the forecast horizon. In some embodiments, if delivering all of the available energy from the RES to the highest prioritized of: (1) the ESS, (2) the power grid, and (3) the one or more industrial processes is not possible because a maximum energy or power limit has been reached, the controller is then configured or programmed to perform the operation of delivering excess energy to the next highest prioritized of: (1) the ESS, (2) the power grid, and (3) the one or more industrial processes and repeat the operation until no excess energy is left. In some embodiments, the one or more industrial processes comprises one or more of the following: hydrogen generation through electrolysis, ammonia production, metal smelting, cryptocurrency mining, data center operation, vertical farming, food production, water purification, atmospheric water generation, direct carbon capture/direct air capture, or glass production.

In another aspect, a system is provided for serving two or more uncorrelated loads connected to a renewable energy powerplant and the two or more uncorrelated loads comprise a power grid and one or more industrial processes. The system may comprise: a) a first renewable energy system (RES) configured to generate electrical power from a renewable energy source; b) an energy storage system (ESS) configured to store energy from the first RES or the power grid; c) a controller communicatively coupled to the first RES, ESS, the power grid, and the one or more industrial processes, and the controller is programmed to: i) determine one or more metrics for different time periods of a forecast horizon, and the one or more metrics relate to sending energy stored in the ESS to: (1) the power grid, and (2) the one or more industrial processes; i) prioritize the: (1) power grid, and (2) one or more industrial processes, and the prioritization is based on one or more of: (1) the one or more metrics calculated in (c)(ii), (2) power grid contractual obligations, (3) scheduled power grid requirements, (4) contractual obligations with the one or more industrial processes, or (5) scheduled energy requirements for the one or more industrial processes; and iii) deliver power stored in the ESS to at least one of the: (1) power grid and (2) one or more industrial processes based on the prioritization.

In some embodiments, the controller is configured to forecast a charge/discharge schedule for the ESS for a time period selected from a plurality of time periods. In some cases, the controller is further configured to determine the power to be delivered to the ESS, power grid or one or more industrial processes based on the forecasted charge/discharge schedule for the ESS. In some embodiments, the system further comprises a second RES. In some cases, the ESS is configured to be charged by the second RES.

In some embodiments, the prioritization is performed a plurality of times throughout the forecast horizon. In some embodiments, if delivering all the available energy from the ESS to the highest prioritized of: (1) the power grid and (2) the one or more industrial processes is not possible because a maximum energy or power limit has been reached, the controller is then configured or programmed to perform the operation of delivering excess energy to the next highest prioritized of: (1) the power grid and (2) the one or more industrial processes and repeat the operation until no excess energy is left. In some cases, the one or more industrial processes comprises one or more of the following: hydrogen generation through electrolysis, ammonia production, metal smelting, cryptocurrency mining, data center operation, vertical farming, food production, atmospheric water generation, water purification, direct carbon capture/direct air capture and glass production.

In another aspect, a method is provided for allocating energy generated by a renewable energy plant comprising a first renewable energy system (RES), an energy storage system (ESS), a power grid, and one or more industrial processes. The method comprises: a) determining one or more metrics for different time periods of a forecast horizon, and the one or more metrics relate to sending energy generated by the first RES to: (1) the ESS, (2) the power grid, and (3) the one or more industrial processes; b) prioritizing the: (1) ESS, (2) power grid, and (3) one or more industrial processes, and the prioritization is based on one or more of: (1) the one or more metrics determined in (b), (2) a state of charge of the ESS during the forecast horizon, (3) one or more limits related to energy requirements of the power grid during the forecast horizon, and (4) one or more limits related to energy requirements of the one or more industrial processes during the forecast horizon; and c) delivering power generated by the first RES to at least one of the: (1) ESS, (2) power grid, and (3) one or more industrial processes based on the prioritization.

In some embodiments, the method further comprises: forecasting a total energy generation by the first RES for a time period selected from a plurality of time periods. In some cases, the method further comprises: determining the power to be delivered to the ESS, power grid or one or more industrial processes based on the forecasted total energy generation by the first RES.

In another aspect, a method is provided for allocating energy generated by a renewable energy plant comprising a first renewable energy system (RES), an energy storage system (ESS), a power grid, and one or more industrial processes. The method comprises: a) determining one or more metrics for different time periods of a forecast horizon, and the one or more metrics relate to sending energy stored in the ESS to: (1) the power grid, and (2) the one or more industrial processes; b) prioritizing the: (1) power grid, and (2) one or more industrial processes, and the prioritization is based on one or more of: (1) the one or more metrics determined in (c)(ii), (2) power grid contractual obligations, (3) scheduled power grid requirements, (4) contractual obligations with the one or more industrial processes, or (5) scheduled energy requirements for the one or more industrial processes; and c) delivering power stored in the ESS to at least one of the: (1) power grid and (2) one or more industrial processes based on the prioritization.

In some embodiments, the method further comprises: forecasting a charge/discharge schedule for the ESS for a time period selected from a plurality of time periods. In some cases, the method further comprises: determining the power to be delivered to the ESS, power grid or one or more industrial processes based on the forecasted charge/discharge schedule for the ESS.

In some embodiments, the one or more metrics comprise an opportunity cost related to energy prices or pricing. In some embodiments, the prioritization further comprises determining a ratio for allocating an amount of the total energy generation by the first RES and/or second RES between at least two items selected from the (1) ESS, (2) power grid, and (3) one or more industrial processes. In some cases, the at least two items are less prioritized over another item. In some cases, the one or more industrial processes are connected to the power grid and directly served by the power grid. In some instances, the power sent to the power grid by the first RES, second RES, and/or ESS and the power drawn from the power grid by the one or more industrial processes are substantially instantaneously matched.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

DETAILED DESCRIPTION

Figure 1:
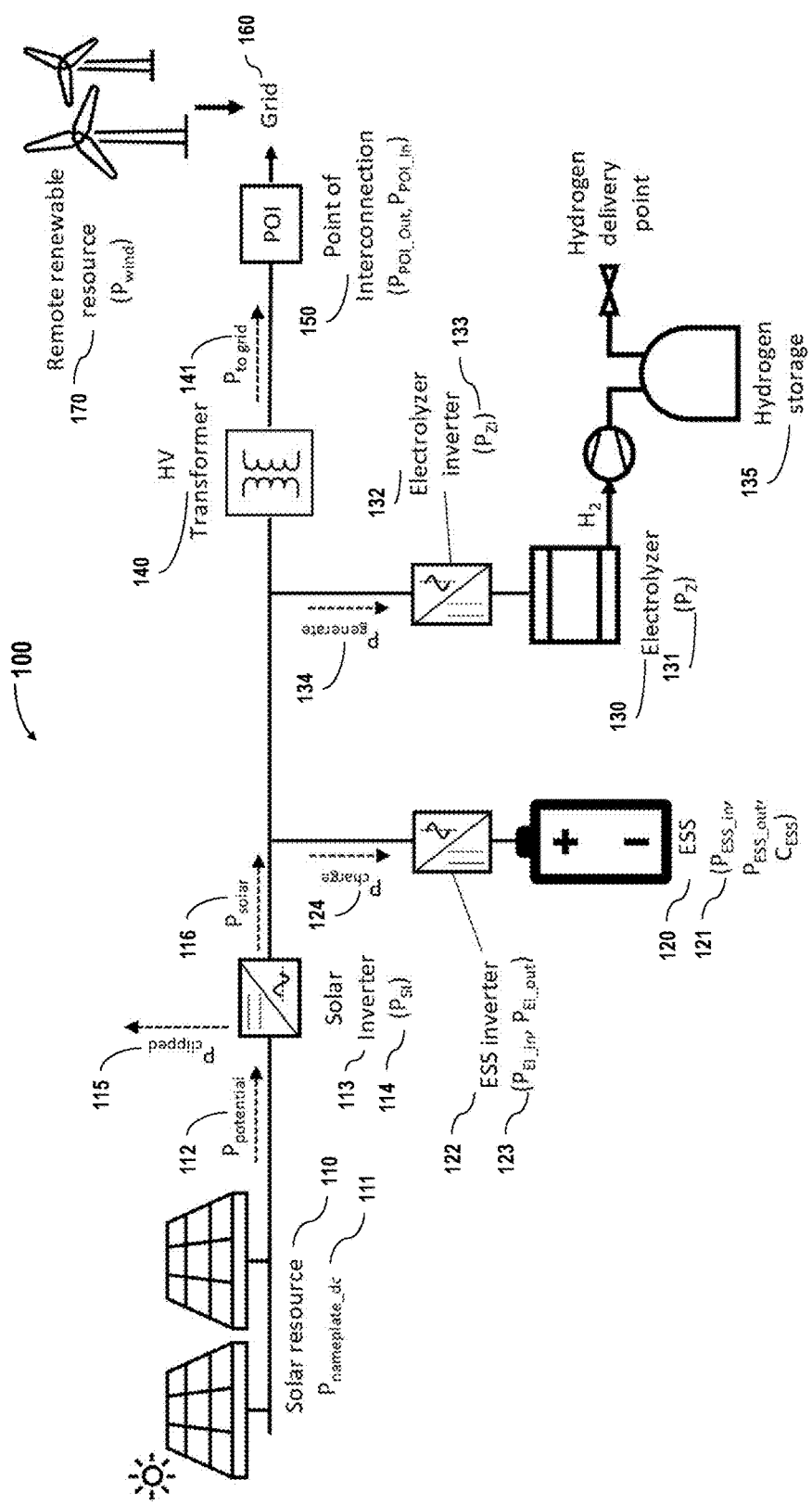
FIG. 1 schematically illustrates a renewable powerplant serving multiple electric loads with improved energy allocation, in accordance with some embodiments.

While various embodiments of the disclosure have been shown and described herein, it will be obvious to those skilled in the art that such embodiments are provided by way of example. Numerous variations, changes, and substitutions may occur to those skilled in the art without departing from the disclosure. It should be understood that various alternatives to the embodiments of the disclosure described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems and methods for serving multiple electric loads with renewable electrical power. The multiple electric loads may not be correlated. The multiple electric loads may be uncorrelated or partially correlated. For instance, the value of directing power to at least one of the electrical loads may vary over time and such variance may be at least partially independent of the value of directing power to another electrical load.

The multiple electric loads may comprise one or more grid loads or energy-consuming processes (e.g., electric load connected through an electrical grid, the electrical grid, etc.), one or more off-grid loads or industrial processes (e.g., electrical loads or energy-consuming process directly connected to the energy source, etc.). In some cases, the electric loads may include, for example, industrial processes such as production of "green" hydrogen, metal smelting, cryptocurrency mining, "vertical" farming, water purification and glass production and various others that may be directly connected to the renewable energy source (RES) powerplant or through the grid. For example, the production of green hydrogen may include separating water into hydrogen and oxygen through electrolysis, which requires electrical power. When the electrical power is supplied by renewable energy, the produced hydrogen is green hydrogen (i.e., no carbon dioxide ($CO_2$)—a greenhouse gas—is emitted or produced in the production of the hydrogen). In some cases, one or more processes that can consume large amounts of electrical energy may be served by the renewable energy directly without passing through the electrical grid. This may be advantageous because it may avoid paying grid charges to transport the energy and/or provide the ability to utilize on-site overproduction that would otherwise be curtailed. For processes that consume large amounts of energy, grid charges can be a significant cost.

In some embodiments of the present disclosure, the system herein may be a renewable energy system—electricity storage system (RES-ESS) powerplant. The system may comprise a renewable energy system configured to generate electrical power from a renewable energy source (RES). For example, the RES may be a solar photovoltaic (PV) array comprising solar cells or a wind farm comprising wind turbines. The system may comprise an energy storage system (ESS) configured to store energy from the RES. The ESS may be a battery energy storage system (BESS). In some embodiments, the system may comprise an energy management system (EMS) configured to direct electrical power from the RES to one or more electric loads, from the RES to the ESS, or from the ESS to the one or more electric loads.

Methods and algorithms herein may be used for determining or optimizing the allocation of energy generated by the RES. In such cases, the energy storage system (ESS) may be taken into account as an electric load along with other electric loads and energy generated by the RES may be allocated among the electric loads and the ESS. Alternatively, the methods herein may be used to allocate power generated by the RES-ESS powerplant. In such case, the ESS is part of the RES-ESS and energy is allocated among the electric loads not including the ESS. The EMS may implement methods or algorithms to determine the delivery of power among multiple uncorrelated or partially correlated electric loads. In some embodiments, the methods and algorithms may flexibly adjust the amount of power: a) sent to/drawn from the ESS and b) sent to each of the electrical loads over time, allowing for economically valuable opportunities. This may beneficially allow for an improved power allocation among multiple not (completely) correlated loads and optimizing the total value for delivering the power to the multiple loads (e.g., electric grid, BESS, green hydrogen, crypto mining, etc.).

The present disclosure provides architectures and methods that allow a RES-ESS powerplant to serve one or more uncorrelated or partially correlated loads. The methods and systems herein can be easily scaled up and can be applied to any number of uncorrelated or partially correlated loads or can be applied to any powerplant configurations.

In some cases, the uncorrelated or partially correlated loads may comprise one or more electrical grid loads, and/or one or more energy-consuming processes directly connected to the RES-ESS without passing through an electrical grid (i.e., off-grid loads). The one or more electric grid loads may include, for example, an electric grid (e.g., a network serving many individual loads) effectively serving as a single load, one or more loads connected to an electric grid and the like. In some cases, the one or more electric grid loads may comprise one or more additional, remotely-located RESs that is connected to the RES-ESS-load system via the electrical grid.

FIG. 1 schematically illustrates a renewable powerplant 100 capable of serving multiple electric loads with improved energy allocation. In some cases, the multiple electric loads may be uncorrelated or partially correlated such that the values for directing the power to the electrical loads are not completely correlated to each other.

The renewable powerplant 100 may comprise at least a renewable energy source (RES) 110 configured to generate electrical power. The renewable energy system 110 may produce energy in a variety of ways, including but not limited to, solar powerplants, wind turbines, geothermal powerplants, hydroelectric powerplants, and various others. For example, the RES 110 may comprise a solar PV array comprising solar cells. As another example, the RES may comprise a wind farm comprising wind turbines.

The powerplant 100 may comprise multiple uncorrelated or partially uncorrelated electric loads electric loads and/or industrial processes. The industrial processes may also be referred to as electric loads in the present disclosure. In the illustrated example, the multiple electric loads may include an energy storage system (ESS) 120, a "green" hydrogen production system that is off-grid, and the grid load 160.

The methods and systems herein can also be applied to various other powerplant configurations. For example, the powerplant may have an additional, remote renewable resource (e.g., remote renewable resource 170), fewer or more off-grid loads, and fewer or more electric grids. It should be noted that the powerplant 100 as shown in FIG. 1 is for illustration purpose only. The multiple electric loads served by the RES may or may not comprise an energy storage system (ESS) 120 or hydrogen production system.

In some embodiments, the renewable energy system may comprise a plurality of RES inverters 113. The RES inverters may convert the direct current (DC) electricity generated by the solar cells to alternating current (AC) electricity that can be used by the electrical grid or other electric loads. The RES inverters may have an aggregate power capacity. In some cases, the RES may have power limitation based on the designed aggregate power capacity.

In some cases, the powerplant may comprise an energy storage system (ESS) 120 configured to store energy from the RES. As illustrated in FIG. 1, the ESS may be a battery energy storage system (BESS). The ESS may have power and storage limitations such as a maximum charge limit, a minimum charge limit, and a state of charge. The ESS may comprise a plurality of ESS inverters 122. The ESS inverters may have an aggregate power capacity which may impose a power capacity limitation on the ESS. The ESS inverter 122 may convert RES AC electric power (e.g., $P_{charge}$ 124) to ESS DC electric power when charging the ESS with RES AC electric power, and convert ESS DC electric power to ESS AC electric power when discharging the ESS AC electric power to the electric grid.

In some cases, the RES may serve energy directly to a hydrogen production system. The hydrogen production system may be an off-grid load. The hydrogen production system may comprise an electrolyzer 130 to generate hydrogen, a hydrogen storage unit 135 (e.g., adsorbent media for releasably binding hydrogen, storage vessels, and/or reversible chemical reactant vessels or beds) and an electrolyzer inverter 132. The electrolyzer inverter 132 may convert RES AC electric power (e.g., $P_{generate}$ 134) to DC electric power when generating hydrogen using the RES AC electric power. The term "hydrogen production system" may also be referred to as electrolysis system which are used interchangeably throughout the specification. As described above, the hydrogen production system is an example of an electrical load not correlated to the grid load. The powerplant can include any other types of load as described above.

The components of the powerplant 100 (e.g., RES, ESS, hydrogen production system, etc.) may have power ratings and/or energy capacity limitations. For instance, the powerplant 100 may have limitations on the power flowing in/out of one or more of the components. For instance, the electrolyzer inverter and the ESS inverter are each capable of limiting the power flowing into the electrolyzer and the ESS, respectively. In some cases, the components of the powerplant 100 may have selected power ratings and energy capacities. In some cases, the power capacities of RES, ESS and/or hydrogen production system may be limited based at least in part on the design of the RES inverters, ESS inverters and/or electrolyzer inverters.

The methods and systems herein may be adapted to various limitations of the powerplant (e.g., power rating and energy capacity limitations) which are detailed later herein. The various limitations of the powerplant may be constant or may vary from time to time. In some cases, the limitations may be known ahead of time. In some cases, the limitations may or may not be precisely measured, estimated or forecasted. In the illustrated example, the RES (e.g., solar resource 110) may deliver direct current (DC) power at a rate up to $P_{potential}$ 112. $P_{nameplate\_dc}$ 111 represents the nominal DC power the solar plant is capable of producing under standard conditions. $P_{potential}$ 112 represents the DC power the solar plant is capable of producing under current conditions. $P_{potential}$ 112 may vary from time to time, depending on lighting conditions, temperature, weather and other factors. The DC power $P_{potential}$ 112 may be converted to alternating current (AC) power by a solar inverter 113. $P_{SI}$ 114 represents the power limit of the solar inverter 113. The power limit of the solar inverter may be a constant value. In some cases, the power limit of the solar inverter may change under some operating conditions (e.g., very high temperatures).

$P_{solar}$ 116 represents the AC output power of the solar inverter at a given time. The AC output power of the solar inverter may vary from time to time, depending on DC power $P_{potential}$ 112 and/or and limited by the power limit of the Solar Inverter PSI. In some cases, the AC output power of the solar inverter may be varied based on control signals sent to the solar inverter. For example, the control signal may control the solar inverters to output less power than the maximum power it could deliver at the corresponding value of $P_{potential}$.

In some cases, the solar inverter 113 may be capable of clipping power from the solar array thereby limiting the amount of power that is delivered by the solar array. Clipping may be accomplished using any suitable techniques. For instance, clipping may be achieved by dissipating the energy, for example in a resistive load, or by altering the electrical characteristics of the solar inverter's electrical inputs, resulting in a limitation of the DC power produced by the solar array. This clipped power $P_{clipped}$ 115 represents the difference between the maximum output power the solar inverter is capable of delivering for the current value of $P_{potential}$ and the power it actually outputs because of the limits of $P_{SI}$ 114 and/or control signals sent to the solar inverter which set the output power of the solar inverter. This clipped power $P_{clipped}$ 115 may represent power that is dissipated, or may reflect a reduction in the DC power actually delivered by the solar plant because of a voltage value or other electrical input value established by the solar inverter.

The AC power $P_{solar}$ 116 delivered by the solar inverter may be directed to multiple possible uses or loads. For example, the AC power may be used to charge an energy storage system (ESS) 120, power an electrolyzer 130 to generate hydrogen, and/or be delivered (e.g., $P_{to\ grid}$ 141) to the electrical grid 160.

As shown in the illustrated example, a portion of the AC power generated by the RES (denoted as $P_{charge}$ 124) may be used to charge the ESS 120. The power $P_{charge}$ 124 is converted from AC to DC by the ESS Inverter 122.

As shown in the illustrated example, a portion of the AC power generated by the RES (denoted as $P_{generate}$ 134) may be used to generate hydrogen. The power $P_{generate}$ 134 is converted from AC to DC by the electrolyzer inverter 130.

As shown in the illustrated example, a portion of the AC power generated by the RES is delivered to the power grid (denoted as $P_{to\ grid}$ 141). In some cases, a portion of the AC power may be passed through a High Voltage (HV) Transformer 140 to raise its voltage to match the grid voltage at the Point of Interconnection (POI) 150.

The methods and systems herein can be easily adapted to various powerplant configurations. In some cases, the powerplant may have one or more remote renewable resources (e.g., remote wind energy resource 170). The remote renewable resource may also be referred to as second source of renewable energy, or second RES. The one or more second RESs can be any type of renewable energy (e.g., a solar resource, a wind, etc.). The second RES may be connected to the grid 160. Power from the second RES may be accessed through the energy grid 160. In some cases, at least a portion of the power generated by the second RES may be used to charge the ESS, produce hydrogen, or be delivered to the grid loads. The remote renewable resource may be connected to the system at the same point of grid interconnection 150 where power from the solar resource is delivered to the power grid. Alternatively, the remote renewable resource may be connected to the system at a different point of grid interconnection.

The ESS 120 is able to both store energy and deliver energy. The amount of energy stored may be limited by its maximum energy storage capacity. The amount of energy delivered may be subject to ensuring sufficient energy (or predetermined amount of energy) stored in the ESS. The ESS may be directed to discharge energy which may be used to generate hydrogen, deliver power to the electrical grid or a combination of both.

As described above, the powerplant may have various limitations associated with the various components or a relationship between the components. In some cases, the ESS inverter may have limited power flowing in and out 123. $P_{EI\_in}$ is the power limit of the ESS inverter when charging the ESS. The value of the power limit may be determined by the properties of the ESS inverter. The power limit of the ESS inverter may be a fixed value. In some cases, the power limit of the ESS inverter may vary under some operating conditions (e.g., very high temperatures). $P_{EI\_out}$ is the power limit of the ESS inverter when discharging the ESS. Such value may be determined by the properties of the ESS inverter which may be a fixed value. The value of $P_{EI\_out}$ may vary under some operating conditions (e.g., very high temperatures).

In some cases, the ESS may have power rate limitations and/or energy storage capacity limitation 121. For example, $P_{ESS\_in}$ is the maximum allowable rate of charging the ESS. The power rate may reflect limitations required to achieve desired service life, efficiency, or other parameters of the ESS. The power rate may vary depending on the state of charge of the ESS, its temperature, or other operating parameters. $P_{ESS\_out}$ is the maximum allowable rate of discharging the ESS. $P_{ESS\_out}$ may not necessarily be equal to the maximum allowable rate of charging the ESS. $P_{ESS\_out}$ may reflect limitations required to achieve desired service life, efficiency, or other parameters of the ESS. $P_{ESS\_out}$ may vary depending on the state of charge of the ESS, its temperature, or other operating parameters. $C_{ESS}$ is the maximum energy storage capacity of the ESS. This may limit the energy that can be discharged from the ESS ranging from its maximum operating state of charge limit to its minimum operating state of charge limit. The maximum energy storage capacity of the ESS may be a fixed value. Alternatively, the maximum energy storage capacity of the ESS may vary depending on operating conditions and/or limitations.

The hydrogen production system may also have power limits. For instance, $P_{ZI}$ 133 represents the power limit of the electrolyzer inverter 132. The value of $P_{ZI}$ 133 may be determined by the properties of the electrolyzer inverter. $P_{ZI}$ 133 may have a fixed value. Alternatively, the value of $P_{ZI}$ may vary under some operating conditions (e.g., very high temperatures). $P_Z$ 131 is the maximum rated input power of the electrolyzer 130. The value of $P_Z$ 131 may be determined by the properties of the electrolyzer. $P_Z$ 131 may have a fixed value, or varied values under some operating conditions (e.g., very high temperatures).

In some cases, the power flowing in and out of the Point of Interconnection (POI) 150 may have limitations. $P_{POI\_Out}$ represents the power limit applicable to delivering power to the electrical grid at the POI. $P_{POI\_In}$ is the power limit applicable to drawing power from the electrical grid at the Point of Interconnection.

In some cases, the remote renewable resource 170 may have limitations. For instance, $P_{Wind}$ represents the power limit of the second renewable energy source.

In some cases, the powerplant may be directed to draw power from the electrical grid 160. Power drawn from the electrical grid (e.g., a negative value for $P_{to\ grid}$ 141) may be used to charge the ESS, generate hydrogen or a combination of both. When the powerplant is directed to draw power from the electrical grid, it may be configured such that the maximum power it can draw from the grid may not be the same as the maximum power it can deliver to the grid. In some cases, the powerplant may be directed not to draw power from the electrical grid, either because of a physical limitation or because of the configuration of its operating controls or because of a limitation imposed by the grid operator or for other reasons.

The powerplant or system 100 may have other power or design limitations. For example, the powerplant or system 100 may be configured such that the power capacities of the solar inverter, electrolyzer inverter and point of interconnection (out) meet certain requirements. For instance, the requirement may be a) $P_{SI}<=P_{EI\_in}+P_{ZI}+P_{POI\_Out}$, or b) $P_{solar}<=P_{charge}+P_{generate}+P_{POI\_Out}$, or a combination of both.

In some embodiments, the components of the powerplant or system 100 may be designed such that the maximum power rating of the solar inverter is not more than the sum of (i) the maximum input power of the ESS inverter, (ii) the maximum input power of the electrolyzer inverter, and (iii) the maximum allowed power flow out to the grid at the POI. The relationship of the power limit and energy capacity between the solar inverter, ESS inverter, the electrolyzer inverter, and the POI may be represented by $P_{SI}<=P_{EI\_in}+P_{ZI}+P_{POI\_Out}$.

In some embodiments, a powerplant energy management system may be configured to control the various components of the power plant such that $P_{solar}<=P_{charge}+P_{generate}+P_{POI\_Out}$, that is, that $P_{solar}-P_{charge}-P_{generate}<=P_{POI\_Out}$. The instantaneous power flow from the solar inverter may not be greater than the sum of (i) the instantaneous power flowing into the ESS to charge it, (ii) the instantaneous power flowing into the electrolysis system to make hydrogen, and (iii) the maximum allowed power flow out to the grid at the POI.

In another example of the powerplant limitation, the powerplant may be designed such that $P_{EI\_out}<=P_{ZI}P_{POI\_Out}$ or, equivalently, that $P_{ZI}>=P_{EI\_out}-P_{POI\_Out}$. In this case, the maximum output power of the ESS inverter may be not greater than the sum of (i) the maximum input power of the electrolysis system, and (ii) the maximum allowed power flow out to the grid at the POI.

In some cases, the powerplant may further have a limit to power inflow at the point of interconnection. For example, the powerplant may be designed such that $P_{POI\_in}<=P_{ZI}+$ $P_{EI\_in}$. In this case, the maximum power that can flow into the system from the electrical grid may not be greater than the sum of (i) the maximum input power of the electrolysis system and (ii) the maximum charging power of the ESS inverter.

In some cases, the powerplant may have ESS inverter power limits. For example, the powerplant may be designed such that $P_{EI\_in}$ is not greater than the power that, after inverter losses, will deliver the maximum permissible power inflow into the ESS. The limitation of $P_{EI\_in}$ may be accomplished by selection of physical equipment (e.g., aggregate power capacity of the ESS inverters) or by means of controls. $P_{EI\_out}$ is not greater than the power that, adjusted for inverter losses, will draw the maximum permissible power from the ESS. The limitation of $P_{EI\_out}$ may be accomplished by selection of physical equipment or by means of controls.

In some cases, the powerplant may have electrolyzer inverter power limit. For example, the powerplant may be designed such that $P_{ZI}$ is not greater than the power that, after inverter losses, would deliver the maximum permissible power inflow into the electrolyzer. The limitation of $P_{ZI}$ may be accomplished by selection of physical equipment or by means of controls.

The above limitations of the powerplant are for illustration purpose only and are not intended to be limiting. The powerplant may have any other limitations and the methods and systems herein can take into account the various limitations and optimize the renewable power allocation among the multiple uncorrelated or partially correlated loads.

The method for allocation of renewable power and/or energy to a plurality of uncorrelated or partially correlated electric loads (e.g., behind the meter or off-grid loads such as ESS, hydrogen production system, grid, etc.) may comprise periodically allocating the available power between these components. The power and/or energy allocation methods herein may comprise opportunity cost/price methodology, method using prescriptive target values or schedule for the ESS, method using prescriptive time-of-year stored volume targets for the hydrogen storage, method based on order of priority, or any combination of the above.

Opportunity Cost/Price Method for Energy Allocation

Figure 2:
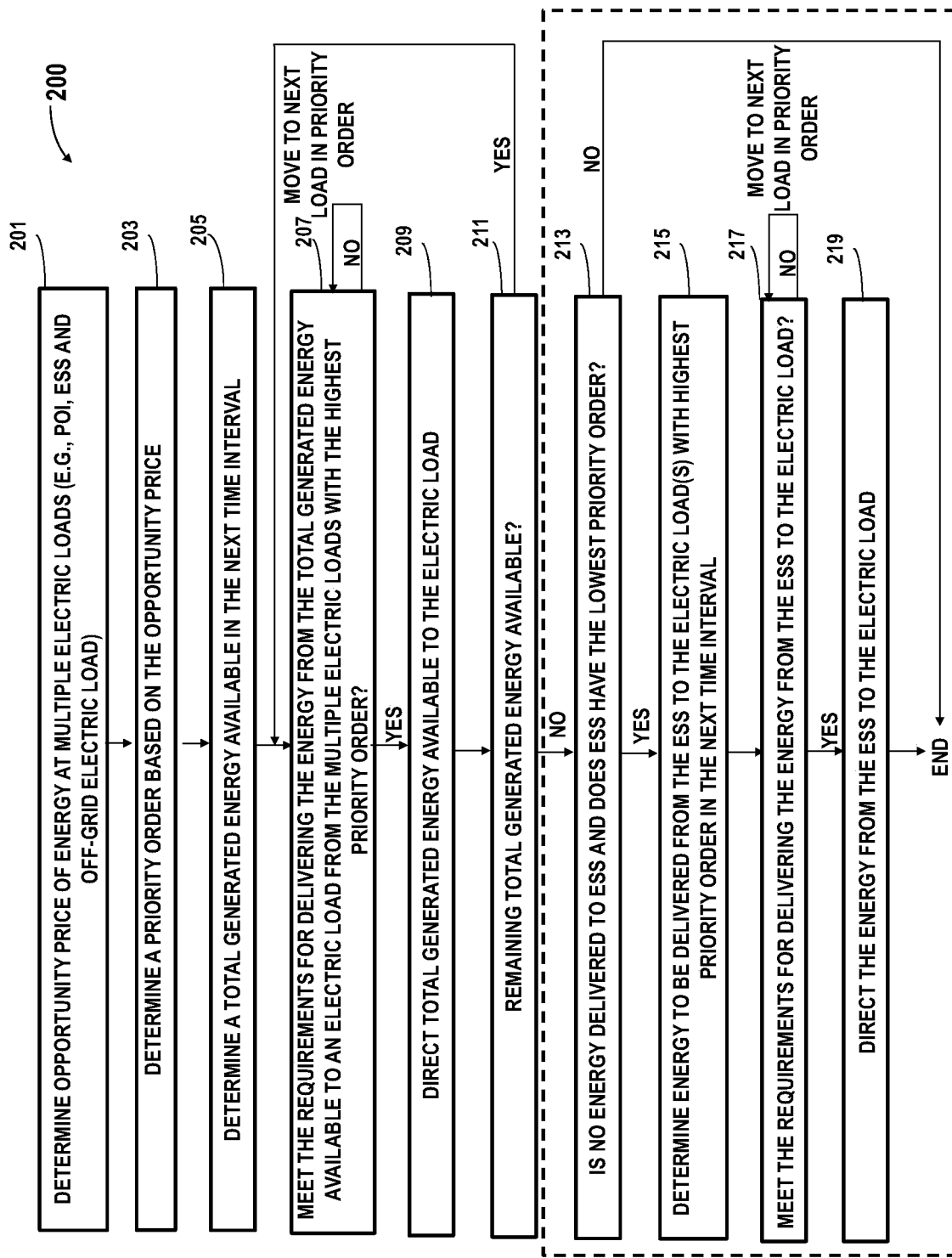
FIG. 2 schematically illustrates an opportunity cost/price method, in accordance with some embodiments of the present disclosure.

FIG. 2 schematically illustrates the opportunity cost/price method 200, in accordance with some embodiments of the present disclosure. In some embodiments, the method 200 may allocate the energy among uncorrelated or partially correlated electric loads based on one or more metrics such as the opportunity cost/price subject to conditions that there is power capacity in the powerplant. In the cases that the powerplant comprises an ESS or electrolysis system, the condition may include requiring defined storage capacity remaining for the energy storage or hydrogen production, respectively, in the powerplant. For instance, power may be sent to the electric load with the highest opportunity cost/price while ensuring there is either a) power capacity or b) in the case of the ESS or electrolysis system, storage capacity remaining.

The method may comprise determining one or more metrics associated with the one or more components of the powerplant for determining energy allocation. In some embodiments, the one or more metrics may include the opportunity cost/price associated with the one or more components. For instance, the method may comprise calculating the opportunity cost for the components of the powerplant. In some embodiments, the opportunity cost for grid energy may be defined as: a) if there is a Power Purchase Agreement (PPA) in effect and applicable, i) when deliveries are within the normal range specified by the PPA, the value of energy under the PPA, ii) when deliveries are below the minimums specified by the PPA, any penalty price specified by the PPA for energy shortfalls, iii) when deliveries are above the maximums specified by the PPA, the price receivable for such excess deliveries under the PPA, b) if there is no PPA, the market price of energy at the time. A Power Purchase Agreement (PPA) may specify a range of power rates, within which a normal value of energy will be specified. The normal range may include a maximum power and may include a minimum power. In some cases, the PPA may also specify a minimum total energy quantity to be delivered during one or more periods. In some cases, the PPA may specify a maximum total energy quantity to be delivered during one or more periods.

In some embodiments, the opportunity price of energy stored in or drawn from the ESS may be calculated based on projected opportunity costs for grid energy during one or more future time periods. For instance, the opportunity price of energy stored in or drawn from the ESS may be calculated specifically at times when the solar resource is not projected to be able to fill the POI capacity, and assuming that the energy already in the ESS will be delivered at the subset of such times when energy has the highest value.

In an example, assuming that the ESS is cycled daily, the method may calculate the opportunity price for the ESS by: i) dividing or discretizing the next 24 hours into a plurality of short time intervals, ii) modeling the opportunity cost for grid energy in each of those time intervals, iii) modeling the amount of energy that will be delivered to the POI in each interval based on a forecast of solar powerplant production and hydrogen production in each time interval up through that time interval and the energy expected to be stored in the ESS at the start of that interval, iv) identifying those time intervals in which the power flow to the POI is forecasted to be less than the maximum allowed power limit at the POI while there is available energy forecasted to be stored in the ESS, v) from those time intervals, selecting the time interval in which the forecast opportunity cost of grid energy is a maximum, and vi) identifying this maximum as the opportunity price of energy in the ESS.

The operation of modeling the opportunity cost for grid energy in the time intervals in ii) can be performed using any suitable methods. For example, the modeling may involve assuming a constant opportunity cost or an average at each corresponding time over the previous several days, or taking into consideration projected power and energy deliveries, the terms of the PPA, and market prices for power.

In some cases, the opportunity cost/price computation may include multiple iterations. For instance, the estimate of ESS opportunity price may be recalculated for future time intervals upon a change of the forecasted production or energy consumption or other real-time conditions. The ESS opportunity price may be updated periodically at pre-determined time intervals. Alternatively, or additionally, the estimated ESS opportunity price may be recalculated or updated upon a detection of a change of the forecasted hydrogen production and/or forecasted energy stored in the ESS (e.g., exceeding a pre-determined threshold).

In some cases, the quantity of energy to be delivered at the identified opportunity price may be limited. The method herein may take into account such limitations for determining the energy allocation.

In some embodiments, the opportunity cost of energy used for hydrogen production may be calculated by establishing a maximum value when the hydrogen storage is empty or nearly empty (e.g., storage is below an empty threshold), a minimum value (e.g., zero) when the hydrogen storage is full or nearly full (e.g., storage is above a full threshold), and an average value when the hydrogen storage is far from being either full or empty.

As an example, the average value may be calculated as: if there is a hydrogen purchase agreement (HPA) in effect and applicable, i) when deliveries are within the normal range specified by the HPA, the value of hydrogen under the HPA, divided by the quantity of energy required to produce a unit of hydrogen, ii) when deliveries are below the minimums specified by the HPA, any penalty price of hydrogen specified by the HPA for hydrogen shortfalls, divided by the quantity of energy required to produce a unit of hydrogen, iii) when deliveries are above the maximums specified by the HPA, the hydrogen price receivable for such excess deliveries under the HPA, divided by the quantity of energy required to produce a unit of hydrogen. If there is no HPA available, the average value may be calculated as: a market price of hydrogen at the time, divided by the quantity of energy required to produce a unit of hydrogen.

The opportunity cost/price calculated for each component may be used to determine the energy allocation. FIG. 2 shows an example of the method 200 for allocating energy based on the opportunity costs. The method 200 may be performed by a controller or computer including a processor and a memory. The controller or computer may be configured to calculate the opportunity cost for a plurality of correlated and/or uncorrelated loads and allocate energy distribution based on the calculated opportunity costs. The controller or computer may calculate the opportunity cost/price for a time period using the methods discussed above, for example, identifying the opportunity cost/price from a contract or agreement, based on predictions of the amount of energy the grid can generate, the energy costs of generating different types of energy such as hydrogen, etc.

In some embodiments, operation 201 may comprise determining the opportunity price of energy for a plurality of loads or energy consuming processes. The plurality of loads or energy-consuming processes (e.g., POI, ESS, hydrogen production system, etc.) may be uncorrelated (e.g., separate and unrelated) or partially correlated and the opportunity price/cost may be calculated using the methods as described above.

Next, at operation 203, the method may comprise determining an order of priority for the multiple loads (e.g., POI, ESS, hydrogen production system, etc.) based on their respective priority price/cost. The controller or computer may organize the order of priority for the different loads in a descending order such that the process, ESS, or the power grid, that is associated with the highest opportunity costs/prices has the highest priority. As described herein, the multiple loads and/or energy-consuming processes may also be referred to as "use of energy" which are used interchangeably throughout the specification.

At operation 205, the method may further comprise determining the total generated energy available in the next time interval or time period. The next time interval may be the upcoming second, minute, hour, day, week, month and the like. In some cases, the total generated energy available may be the sum of the energy expected to be generated by the RES (e.g., solar resource) and the energy expected to be delivered to the POI by a remote renewable energy source (e.g., remote wind resource). The total generated energy available for the future time interval can be estimated using any suitable method or technique. For instance, the total generated energy available may be estimated using models or daily and/or annual production forecasts as described above.

Next, at operation 207, the method may comprise determining whether the requirements are met to direct power and energy from the total generated energy available to the use of energy (e.g., multiple loads) with the highest opportunity cost. The requirements may be based on the limitations of the components. For example, the requirements may comprise i) power directed to the use of energy may not exceed the maximum allowed input power to that use of energy at that time and/or ii) energy sent to the use of energy may not exceed the maximum energy that use of energy can absorb at that time. As an example, the maximum energy that a use of energy can absorb may be dependent on the remaining storage capacity of the ESS, and/or the internal hydrogen storage limit of the hydrogen production system. In the cases where POI and wind resource are components of the powerplant, the power flow to the POI and from the wind resource may be netted against each other depending on how the POI power limit is defined. If the requirements are met, at operation 209, the method may proceed with directing the power and energy to the use of energy with the highest opportunity cost.

At operation 211, the method may include determining if any portion of the total generated energy available cannot be delivered to the use of energy with the highest opportunity cost such as because doing so would exceed of limits the use of energy can accept. A controller may perform operation 211 by subtracting the limit to the amount of energy the use of energy can accept from the total generated energy available. Upon determining there is unused energy, the controller may identify the use of energy with the next highest priority and deliver the unused energy to the identified use of energy as described with respect to operations 207, 209, and 211. Operations 207, 209, 211 may be repeated until the all of the total generated energy available is allocated to the use of energy according to the priority order (e.g., descending order of the opportunity cost).

In optional cases where the power plant includes an ESS, at operation 213, the method may include determining whether none of the total generated energy available was used to charge the ESS, and whether the opportunity cost of ESS energy is lower than the opportunity cost of the other loads (e.g., either the POI or the hydrogen generating system). If both of these criteria are met, at operation 215, the method may include determining the total stored energy that could be delivered from the ESS in the next time interval (e.g., the next defined time interval), and, at operation 219, direct power from the ESS to the use of energy (e.g., POI or hydrogen production system) with the highest opportunity cost, when the requirements are met, as determined in operation 217.

Determining the total stored energy that could be delivered from the ESS in the next time interval may include determining the total amount of energy that is currently stored in the ESS and determining the amount of energy the ESS is required to have to provide energy to another use of energy during the next time interval. For example, if the ESS is required to provide power to another component (such as another energy use or the grid) during the next time interval, the ESS may need to maintain a predefined amount of energy to do so. The predefined amount of energy may be a user input amount of energy and/or an amount of energy that a controller determines based on historical energy use by the component (e.g., if the component on average uses 7000 kilowatt-hours of energy in an hour time interval, the controller may set the predefined amount of energy to 7000 kilowatt-hours or a tolerance amount of energy above 7000). The controller may similarly determine the expected energy requirements for any number of energy loads for which the ESS provides energy. The controller may aggregate the expected energy requirements for the different energy uses to determine an aggregate expected energy use. The controller may then predict a total amount of energy that will likely be generated and/or stored in the ESS over the time interval based on a current charge and/or discharge schedule of the ESS and forecasts (e.g., a forecast horizon) for the time interval. The controller may then determine the total stored energy from the ESS that could be delivered to the use of energy with the highest opportunity costs by subtracting the aggregated expected energy from the total stored energy. The controller may then direct the determined amount of energy to the use of energy with the highest priority. The requirements for delivering the energy from the ESS to the electric load with the highest opportunity cost may be similar to the requirements as described in operation 207. For instance, the requirements may include the power and energy limitations of the components (e.g., maximum energy that the use of energy can absorb such as the internal hydrogen storage limit of the hydrogen production system).

If the total stored energy that could be delivered is not delivered to the use of energy with the highest opportunity cost because the requirements are not met (e.g., fails to meet the power/energy limitations), the method may direct the available stored energy to the use of energy with the next-highest opportunity cost when the next-highest opportunity cost is higher than the opportunity cost of the ESS energy. The method may comprise repeating the operations 217 and 219 and move to the electric load with the next-highest opportunity cost on the priority order until either the available stored energy that could be delivered has been fully allocated, or no use of energy remains to which energy can be allocated that has a higher opportunity cost than energy in the ESS. Detailed examples and methods about allocating energy discharged from the ESS to the multiple loads are described later herein.

Although the above operations show method 200 for determining energy allocation between uncorrelated or partially correlated loads in accordance with embodiments herein, a person of ordinary skill in the art will recognize many variations based on the teaching described herein. The operations may be completed in a different order. Operations may be added or deleted. Some of the operations may comprise sub-steps. Many of the operations may be repeated. For instance, the opportunity price/cost of the energy may be determined (operation 201) periodically or upon a change of the forecasted hydrogen production and/or forecasted energy stored in the ESS. In some cases, upon a recalculation/update of the opportunity price/cost, operations such as determining the priority order operation 203 and other subsequent operations may be triggered to reallocate the energy accordingly.

One or more of the steps of method 200 may be performed with processing circuitry in any one of the computing devices (e.g., controller of the powerplant, energy forecasting and allocation system (EFAS), EMS, etc.) described herein. Such circuitry may be programmed to provide one or more of the steps of the method 200, and the program may comprise program instructions stored on a computer readable memory or programmed steps of the logic circuitry.

In some embodiments, the method of allocating power based on the order-of-priority or opportunity cost as described above may permit a user to modify the order of priority, set up the allocation between selected components (e.g., designate fixed allocation ratio between selected loads), change/select the method for determining the maximum value, change or set up the limitations of the powerplant, manually trigger a performance of one or more operations, and various other aspects of the method or operational parameters of the system. For instance, an operator of the powerplant may change or select a method used for maximizing the forecasted value of power delivered to the multiple loads or uses. The operator may, for example, choose the order of priority by periodically applying an opportunity cost method to assign priority in descending order of opportunity cost; then, rather than apply an opportunity cost method at each interim step, the operator may apply the order of priority method until the next application of the opportunity cost method.

In some embodiments, the order of priority may be established by a user. The order of priority may or may not be based on the opportunity cost/price computed using the methods described above. In some cases, the operator may establish the order of priority by time of day and/or by time of year. This may beneficially provide flexibility to the control of the powerplant particularly when the opportunity costs are difficult or impossible to predict with any precision. In such case, the operator may rank the multiple loads or uses based on the expected opportunity costs that are estimated using any suitable method (e.g., based on empirical data, etc.).

The methods and systems herein may conveniently adapt to various types of limitations in the powerplant in a dynamic manner. For instance, the solar inverter may be operated so as to dissipate or curtail solar power production in such a way that an increasing ramp rate of power flowing into the electrolyzer inverter may be kept within design limits. In the case where the power plant includes an ESS, the solar inverter and the ESS may be operated so as to limit both increasing and decreasing ramp rates of power flowing into the electrolyzer inverter, and thus keep it within design limits. Operation of the solar inverter and ESS in this manner may briefly supersede the order of priority method described above, without affecting the order-of-priority operation otherwise (i.e., when the ramp rates would not fall outside design limits).

In some cases, the ESS may have time-varied limitations. For instance, the powerplant may have a requirement for a state of charge (SOC) of the energy storage device. For example, the powerplant may set up target values for the SOC that may require attainment of specific battery state of charge SOC conditions at particular times in a given day (with SOC being generally defined as the percentage of the full capacity of a battery that is still available for further discharge). An Energy Storage System (ESS) may be given a schedule by which to reach a certain state of charge (SOC) by charging or discharging. For example, an ESS may be instructed to reach 100% SOC by 5 PM, and then reach 10% SOC by 10 PM.

The method may use the forecast of the total generated energy production to determine how much energy is to be sent to the ESS to ensure the ESS meets the SOC target. Such determination may be updated periodically throughout the day to adjust for changes to the solar production forecast and the actual SOC of the ESS. In some cases, the remaining energy that is not required to meet the SOC target may then be directed to the other loads (e.g., POI and to production of hydrogen). In some cases, the allocation of the remaining energy between these uses of energy may be performed using any suitable method such as the opportunity cost method as described above.

The system and method may employ any suitable techniques to meet the SOC targets of the ESS. For example, the powerplant may integrate accurate renewable energy production forecasts (e.g., for PV or wind production) into the implementation of Coordinated Charge/Discharge (CCD) control mode (as described in the MESA specifications). In certain embodiments, a periodic maximum SOC value specified in a SOC schedule (e.g., the maximum SOC for a particular day, wherein such value may be less than 100%) is attained as late as possible to enable maximal recovery of excess energy that would otherwise be clipped by a DC/AC inverter. In certain embodiments, a periodic maximum SOC value specified in a SOC schedule may be attained as late as possible by charging the ESS at the lowest average charging rate that will satisfy the SOC schedule; in certain embodiments, this may involve maintaining the minimum possible average SOC that still enables satisfaction of the SOC schedule. By charging an ESS as late as possible, headroom remains in the ESS to implement ancillary services that further increase the revenue generated by the RES-ESS plant. One benefit of maintaining average SOC of an ESS as low as possible is that it may prolong the life of batteries associated with the ESS, since it is widely recognized that various types of lithium-based batteries exhibit increased degradation with maintenance of a high average SOC. The CCD control method, the control mechanism application and its various components are described in US20200259358 entitled "Coordinated control of renewable electric generation resource and charge storage device" which is incorporated by reference herein in the entirety.

In some embodiments, a CCD control mode may be implemented in a prioritization approach or an opportunity cost approach. For example, in a prioritization approach, a controller may determine how much power should go to the ESS (e.g., identify a defined amount of power to send the ESS, in some cases at a predetermined time, from memory of the controller). The controller may then determine if the ESS is the top priority. If the controller determines the ESS is the top priority, the controller may send the determined amount of power or, if the renewable energy source did not generate the determined amount of power, the amount of power the renewable energy source generated, to the ESS. However, if the controller determines the ESS is a lower priority, the controller may transmit power to the uses of energy with higher priorities and then to the ESS as long as there is enough left power over. The controller can similarly use a CCD control mode using opportunity cost as the selection variable instead of priority. For example, the controller can send energy to the ESS based on the ESS having the highest opportunity cost or after transmitting power to other uses of energy with higher opportunity costs.

In another example of using a CCD control mode, a controller may adjust the priority or opportunity cost of an ESS based on a SOC schedule. For instance, if an ESS has a low priority or opportunity cost and a SOC schedule calls for charging the ESS immediately (e.g., at a set time of day, regardless of priority or opportunity cost), the controller may increase or adjust the ranking or opportunity cost of the ESS such that the controller sends power to the ESS as called for by the SOC schedule before previously higher priority or opportunity cost uses of energy. Accordingly, the controller can implement the systems and methods described herein while accounting for CCD control modes and SOC schedules.

In some embodiments, the hydrogen production system may have time-varied limitations. For instance, the limitation may include predetermined time-of-year stored volume target values. For example, the powerplant may establish target values for the quantity of hydrogen stored in a hydrogen storage system at one or more times of the year. In this case, the allocation of the total generated energy production (e.g., for each day) may be determined to meet the stored hydrogen volume target(s) first (e.g., using rate model or daily and annual production forecasts). Next, the remaining energy that is not required to meet the stored hydrogen volume target(s) may be directed to the other loads (e.g., POI and to production of hydrogen). In some cases, the allocation of the remaining energy between the use of energy may be performed using any suitable method such as the opportunity cost method or order-of-priority method as described above.

The methods and systems described herein may be capable of allocating the renewable energy and power using any combination of the aforementioned methods and provide flexibility to be applied to various powerplant configurations, dynamic or complex limitations. For example, the system may utilize a combination of the order of priority (established by an operator) method and opportunity cost method. Below are examples of the methods applied to various scenarios. It should be noted that these methods and examples are for illustration purpose only, a person of ordinary skill in the art will recognize many variations based on the teaching described herein.

Example 1

In the first example of allocating the renewable energy based on prioritization, a priority order including POI, ESS and hydrogen production system in the descending order may be determined. For instance, the priority order may be established by an operator of the powerplant. Alternatively, the priority order may be determined based on the opportunity cost/price calculated as described above.

The renewable energy such as solar power is directed to the POI up to the POI power limit, next any excess power over the POI limit is directed to charge the ESS up to the power and/or storage limits of the ESS, and then any excess power over the sum of the POI power limit plus the ESS charging power limit is directed to generate hydrogen up to the power and hydrogen storage limits of the hydrogen production system. In the case the powerplant comprises a remote renewable resource such as a remote wind resource (or other renewable resource accessed through the power grid), any power produced by the remote renewable resource may be supplied solely to the power grid.

Such prioritization method may be used, for example, when the primary purpose of the solar plant is to act as a dispatchable solar powerplant (i.e., a "PV+S" plant), and the hydrogen production may use the solar power production that would otherwise be curtailed. For example, the solar power production might otherwise be curtailed because it could not be sent to the grid (e.g., the power flow to the grid was already at the POI limit, or the grid operator had imposed a temporary limitation on power deliveries to the grid at a level below the POI limit and below the available solar power production) and it could not be sent to the ESS (e.g., either because the power flow to the grid was already at an ESS Inverter or ESS power limit, or because there is insufficient remaining storage capacity in the ESS, or because of a limitation imposed by an SOC target of the ESS). The dispatchable solar powerplant may be an integrated renewable energy source (RES) (e.g., photovoltaic) and energy storage system (ESS) facility or plant.

Figure 3:
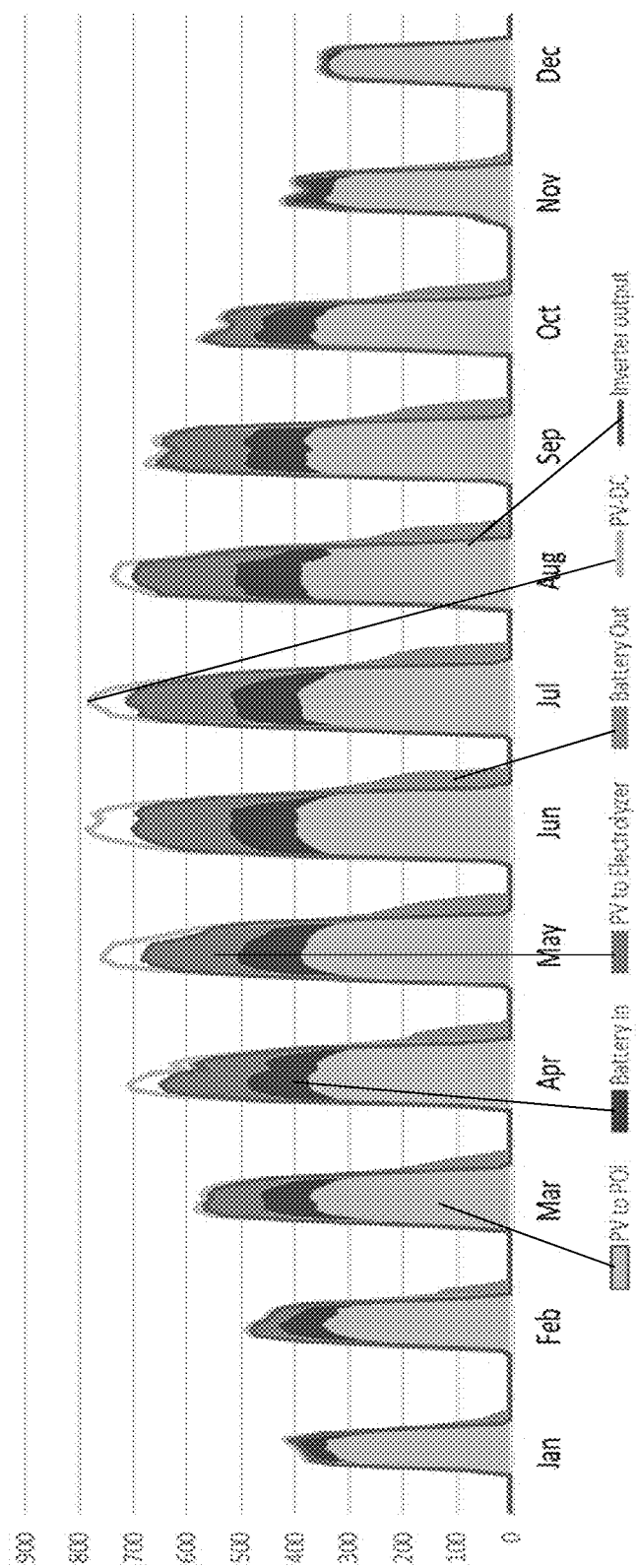
FIG. 3 shows an example of a priority order method, in accordance with some embodiments.

FIG. 3 shows an example of priority order method as described above. For example, the method may rank the POI, ESS, and hydrogen production in the descending order. The "12×24 graph" represents a full year of 12 months, and shows one day per month, with the value in each hour of that day being the average of the values at that hour in each actual day of the month. In the illustrated example, solar power is produced and there is no other power source, e.g., off-site wind, in use. The solar power is first sent to the power grid until the POI limit is reached, then is sent to charge the ESS (e.g., a battery), and then the remaining power is used to generate hydrogen. During some months of the year the potential solar production is shown as exceeding the capacity of the solar inverter, and being curtailed. The example also shows the energy from the battery/ESS being sent to the power grid at the end of the (solar) day.

In the example, the hydrogen production is seasonal. For instance, the hydrogen production is maximized during the summer while minimized during the winter. This may result in a relatively low capacity factor for the electrolyzer. In this example the capacity factor for the electrolyzer is approximately 18%. As shown in the graph, the peak solar power delivered to the grid is relatively constant throughout the year, but power is delivered to the grid for a much longer time each day during the summer than during the winter. The chart in the example shows average values, and the average of a given hour over a full month may include times when the power going to the grid is below the POI limit (and no power is going to other uses) but will never include times when the power going to the grid is above the POI limit, so that the average must be equal to or less than the POI limit; and yet there may be other days when, at the same hour the POI limit is reached and power is going to both other applications, so that their average is non-zero. In the example, the POI limit is 400 MW. The chart shows less than 400 MW going to the grid, on average, even though the battery is being charged and hydrogen is being produced at the same times of day. However, because the chart shows average values, it does not mean that power is being used to charge the battery and/or produce hydrogen at times when the power going to the grid is below the POI limit: rather, at a particular time of day, on some days, the power going to the grid may be below the POI limit while, on other days at the same time of day, the power going to the grid may be at the POI limit and power may be flowing to charge the battery and/or produce hydrogen, with the result that, averaged over a full month, the power going to the POI at that time of day may be below the POI limit even as there is power flowing to charge the battery and/or produce hydrogen.

Example 2

As variation of the priority order in Example 1, a priority order of POI, hydrogen production system and ESS may be determined. Assuming in this prioritization, any power produced by the remote renewable resource (e.g., wind resource) is supplied to the power grid.

This exemplary prioritization method may be used, for example, where daytime power production and hydrogen production are most valuable, but the ESS can capture otherwise-excess solar power production for delivery later in the day/night, rather than allow it to be curtailed or dissipated.

Example 3

In the third example, the method may be a combination of prioritization and proportional charging. The method may comprise ranking POI as top priority, then allocating the energy between the hydrogen production system and ESS with a predetermined ratio. For instance, solar power is directed to the POI up to the POI power limit, then any excess power over the POI limit is split in a fixed ratio between charging the ESS and producing hydrogen. The ratio may be predetermined, a fixed constant. Alternatively, the ratio may be adjusted dynamically or periodically based on projected total solar power production during a forecast period.

In some cases, when the allocated power exceeds an ESS charging power and/or energy limit, any power above the limit may be directed to produce hydrogen. In some cases, when the allocated power exceeds a hydrogen production power/hydrogen storage limit, any power above that power limit may be directed to charge the ESS. In some cases, when the power exceeds both the ESS charging and hydrogen production power limits, the excess power above the sum of the limits may be dissipated or curtailed. In the illustrated example, it is assumed that any energy produced by the remote renewable resource (e.g., wind resource) is supplied to the power grid.

The above prioritization method may beneficially allow for improving the capacity factor of the hydrogen production plant over the scenario where the ESS is prioritized first. When the ESS is prioritized first and the ESS has an excessively large charge rate capability, the ESS may absorb all the available excess power during the early part of the day and become full, the hydrogen production system may then absorb all the available excess power during the later part of the day. In a proportional charging system when properly designed, the total energy sent to the ESS and the hydrogen production system may be the same over the course of the day, but each may receive the energy over a longer time and at a lower average power. This may beneficially allow the use of a smaller electrolyzer, with a higher capacity factor, to produce the same total quantity of hydrogen. The smaller electrolyzer can advantageously reduce capital expenditures. In some cases, the lower input power to the ESS (e.g., when the ESS is a flow-type battery) may further reduce capital expenditures.

In some cases, the improved capital efficiency of Example 3 can be alternatively achieved by using the method of Example 1, such as by limiting the ESS charging rate (e.g., by appropriate choice of $P_{EI\_in}$, or by control signals sent to the ESS inverters to temporarily reduce $P_{EI\_in}$).

Example 4

A variation of the method in Example 3 is to split the power between ESS and hydrogen production system based on the remaining ESS and hydrogen storage capacity. For instance, solar power is directed to the POI up to the POI power limit, then any excess power over the POI limit is split between charging the ESS and producing hydrogen, where the ratio of split depends on the remaining (unfilled) storage capacity of the ESS and on the remaining (unfilled) storage capacity for hydrogen. For example, if the ESS is almost fully discharged, while the hydrogen storage capacity is almost full, most of the excess power over the POI limit may be directed to charge the ESS. Alternatively, if the ESS is almost fully charged, while the hydrogen storage capacity is almost empty, most of the excess power over the POI limit may be directed to produce hydrogen.

The split/allocation ratio may be based on the proportion of the available storage capacities. For example, the allocation ratio may be determined based on the stored resource (e.g., hydrogen or stored energy) in shorter supply at the present time. Alternatively, the allocation ratio may not be based on the proportion of the storage capacities between the ESS and the hydrogen storage system. For example, since hydrogen may be drawn from the system continuously, it may be desired to produce hydrogen at all times, even when the ESS is almost fully discharged (e.g., greater weight is assigned to hydrogen production system).

This method may be adopted when the near-term opportunity costs of stored energy and hydrogen cannot be determined precisely due to high volatility in their opportunity costs. In this case, the order of preference may be difficult to determine, but there is option value in having a supply of hydrogen and a supply of stored energy, and it is advantageous to direct energy to both purposes.

Example 5

In this exemplary method, the prioritization may include the priority order of ESS, POI and hydrogen production. The total generated energy (e.g., sum of solar and wind energy) is directed to charge the ESS, up to the charging limits (e.g., power and storage capacity) of the ESS and within the inflow limits at the POI, next any excess power is directed to the grid up to the point where the power flow to the POI (e.g., energy flow from the solar resource) reaches the POI limit, and then any excess power being produced above this by the solar resource is directed to produce hydrogen up to the power/capacity limits of the hydrogen production system, above which any further power produced by the solar resource is dissipated or curtailed. In some cases, once the ESS is charged, any energy produced by the wind resource is supplied to the power grid and is not used to produce hydrogen.

The above method may be suitable for, for example, a "Super-Peaker" type design, where a relatively small solar plant is used to charge a relatively large energy storage system as standby capacity. Once the storage is full, any additional power may be sent to the grid. The solar power could be sent to the grid ordinarily but if the solar output exceeds the POI limit during daytime production peaks, the system may use the power to produce hydrogen and thus improve economic utilization of the asset's energy production potential, relative to dissipating or curtailing some of the solar production.

Example 6

In this exemplary method, the prioritization may include the priority order of ESS, hydrogen production and POI. The total generated energy (e.g., sum of solar and wind energy) is directed to charge the ESS, up to the charging limits (e.g., power and storage capacity) of the ESS and within the inflow limits at the POI, next any excess energy is directed to produce hydrogen up to the limits (e.g., power and hydrogen storage capacity) of the hydrogen production system and within the inflow limits at the POI, and then any remaining energy is directed to the grid up to the point where the power flow to the POI reaches the POI limit, finally any excess power being produced above the POI limit by the solar resource is dissipated or curtailed.

The above method may be suitable for, for example, a "Super-Peaker" type design, where a relatively small solar plant is used to charge a relatively large energy storage system as standby capacity, and where demand for output power from the plant is ordinarily low (i.e., the plant is operated as a true "peaker"). Once the storage is full, the solar power may be used to manufacture hydrogen, potentially as a second type of energy storage or for industrial purposes. Only at times when the solar production might exceed the quantity the hydrogen production system could absorb, the power would be directed to the grid for improved economic value, rather than dissipating or curtailing the excess production.

Example 7

In another example of combining the proportioning method and priority order method, the method may rank the ESS as top priority, then allocate the energy between POI and hydrogen production system in a selected ratio. For instance, the total generated energy (e.g., sum of solar and wind energy) is directed to charge the ESS, up to the charging limits (e.g., power and storage capacity) of the ESS, then any excess power over the POI limit is split in a selected ratio between producing hydrogen and the power grid. The ratio may be fixed. Alternatively, the ratio may be adjusted dynamically or periodically based on projected total power production during a forecast period. If the power exceeds the POI limit, any power above the limit may be directed to produce hydrogen. Alternatively, if the power exceeds a hydrogen production power or hydrogen storage limit, the excess power above that limit may be directed to the POI. In some cases, when the power exceeds both the hydrogen production power limit and the POI limit, the excess power above the sum of those limits may be dissipated or curtailed.

The above method may be used, for example, in a "Super-Peaker" type design, to improve the capacity factor of the associated hydrogen production facility.

Example 8

Another variation of the above method is allocating the power between POI and hydrogen production system based on an available storage capacity for hydrogen. For instance, the total generated energy (e.g., sum of solar and wind energy) is directed to charge the ESS, up to the charging limits (e.g., power and storage capacity) of the ESS, within the power inflow limits of the POI, next any excess power over the ESS limit is allocated between producing hydrogen and the power grid. The allocation may be based on the extent to which there is unfilled hydrogen storage capacity available. For example, if the hydrogen storage capacity is full, then either no power is allocated to produce hydrogen, or only enough power is allocated to replace any hydrogen being drawn from the storage simultaneously. In some cases, if the hydrogen storage capacity is empty, a larger amount of power may be allocated to hydrogen production, to begin to fill the storage. When the power exceeds the POI limit, any power above the limit may be directed to produce hydrogen. Alternatively, if the power exceeds a hydrogen production power or hydrogen storage limit, the excess power above that limit may be directed to the POI. If the power exceeds both the hydrogen production power limit and the POI limit, the excess power above the sum of those limits may be dissipated or curtailed.

The above method may be used, for example, in a "Super-Peaker" type design. It may be an alternative to the method in Example 7.

Example 9

In this exemplary method, the prioritization may include the priority order of hydrogen production, POI and ESS in the descending order. The total generated energy (e.g., sum of solar and wind energy) is directed to hydrogen production system, up to the power and storage limits of that system, then any excess power is directed to the grid up to the point where the power flow to the POI (e.g., power from the solar resource) reaches the POI limit, and any excess power being produced above this by the solar resource is directed to charge the ESS up to the power or capacity limits of the ESS, with any further excess solar power being dissipated or curtailed. In some cases, once the hydrogen system cannot absorb more power, any further energy produced by the wind resource is supplied to the power grid and is not used to charge the ESS.

The above method may be used, for example, if an electricity offtaker wanted electrical power primarily during the summer season. During winter, the method may direct all solar power to hydrogen production, but during the summer there could be more solar power produced than the hydrogen production system could absorb, enabling the plant to deliver electrical power to the offtaker via the grid during the summer. In addition, the inclusion of an ESS may allow the plant to deliver electrical power to the offtaker, via the grid, during summer evenings.

Figure 4:
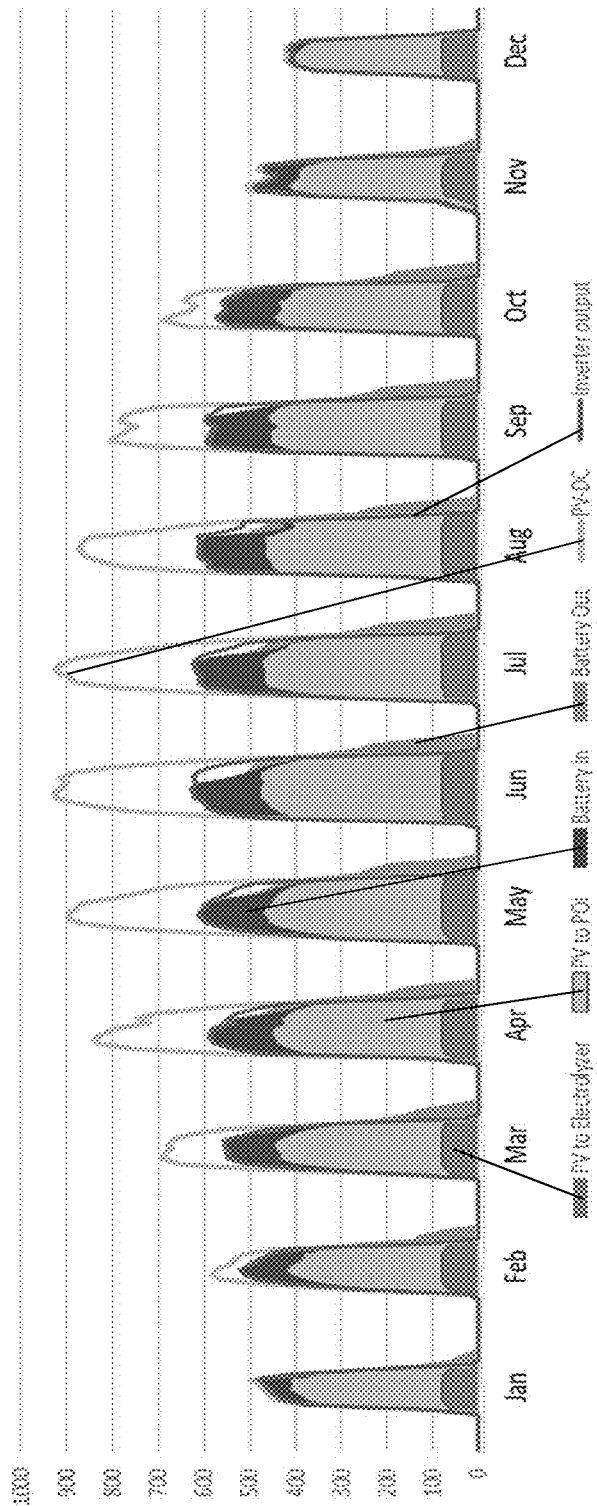
FIG. 4 shows an example of a method with priority order of hydrogen production, POI and ESS in the descending order.

FIG. 4 shows an example of method in Example 9 (priority order of hydrogen production, POI and ESS). The 12×24 graph shows solar power being produced. In the example, there is no other power source (e.g., off-site wind) in use. The solar power is first sent to produce hydrogen up to the power limit of the hydrogen production system, then to the power grid until the POI limit is reached, and then is sent to charge the ESS (e.g., a battery). The examples also show the energy from the battery being sent to the power grid at the end of the solar day.

In the example, hydrogen production is less seasonal (e.g., relatively stable with respect to seasons) because the peak power delivered to hydrogen production is essentially equal to the maximum power capacity of the hydrogen production system every day (or on most days). This may increase the capacity factor of the electrolyzer substantially relative to the method in Example 1.

The hydrogen production system may have seasonal factor where it may be driven at its maximum power level for more hours of each day during the summer than during the winter. In the example, peak solar power delivered to the grid is relatively constant throughout the year, which is achieved by over-building the solar array (e.g., the capacity of the solar array is more than 900 MW, as compared to less than 800 MW in the non-oversized solar array such as in FIG. 3) and limiting its summertime power output by curtailment. As an alternative, the summertime output may be curtailed less, and may result in a strongly seasonal pattern of power delivery to the power grid.

Example 10

Another variation of the prioritization may include the priority order of hydrogen production, ESS and POI. The total generated energy (e.g., sum of solar and wind energy) is directed to the hydrogen production system, up to the power or capacity limits of that system, and any excess power above this limit is used to charge the ESS, up to the charging limits (e.g., power and storage capacity) of the ESS, then any further excess energy is directed to the power grid up to the point where the solar power flow to the POI reaches the POI limit, and any excess power being produced above this by the solar resource is dissipated or curtailed.

The above method may be used, for example, in a situation where the primary purpose of the plant is to act as an energy storage system for grid reserves and resiliency. The power may first be used to drive a hydrogen production system, maximizing the capacity factor of that system, then used to ensure that an ESS was fully charged, and then any remaining excess power is delivered to the grid as produced. The method may also be adopted in the scenario where the primary purpose of the plant is to produce hydrogen, but where the plant also has a point of interconnection to the electrical grid (POI). In this application, the available energy may first produce hydrogen, then to charge the ESS, where the primary purpose of storing energy in the ESS is to power the hydrogen production system when there is insufficient instantaneous renewable power. In this application, power may be delivered to the grid when there was excess available renewable power, which would otherwise be dissipated or curtailed.

Example 11

In another example of combining the proportioning method and priority order method, the method may rank the hydrogen production system as top priority, then allocate the energy between POI and ESS with a selected ratio. For instance, the total generated energy (e.g., sum of solar and wind energy) is directed to the hydrogen production system, up to the power or capacity limits of that system, any excess power is then split in a selected ratio between charging the ESS and the power grid. The ratio may be a fixed value. Alternatively, the ratio may be adjusted periodically based on projected total solar power production during a forecast period and/or on the state of charge of the ESS at the start of a forecast period. If the power exceeds power/capacity limit of the ESS, any power above the limit may be directed to the POI. If the power exceeds the POI limit, the excess power above that limit may be directed to charging the ESS. If it the power exceeds both the ESS power/capacity limit and the POI power limit, the excess power above the sum of those limits may be dissipated or curtailed.

The above method may be used, for example, when the primary purpose of a powerplant is to act as an energy storage system for grid reserves and resiliency. The power may first be used to drive a hydrogen production system, maximizing the capacity factor of that system, then used to ensure that an ESS was fully charged, and then any remaining excess power may be delivered to the grid as produced. By using a simultaneous power split between the ESS and the POI, the system may beneficially reduce the input power limit of the ESS for a given amount of energy stored there, in a way similar to that used in Example 3 and Example 7. This may be particularly advantageous when the ESS is a flow-type battery.

As described above, the method and system herein may utilize any combination of the above method/techniques. The methods can be combined flexibly by operating concurrently or operating in different time intervals. For instance, the system may operate using the method in Example 1 (e.g., priority order of POI, ESS, and hydrogen production system) by day, combined with either method in Example 9 (e.g., priority order of hydrogen production system, POI, and ESS) or Example 10 (e.g., priority order of hydrogen production system, ESS, and POI) by night. The combined method may provide additional benefits. For example, during the day the solar production is sufficient to deliver enough energy to all the applications where it is preferred that the POI and ESS receive priority to minimize unexpected variations in power delivered to the grid; while at night the wind energy is directed first to produce hydrogen because at night grid power is not in short supply.

In another example of combining the methods, the system may operate using the method in Example 1 (e.g., priority order of POI, ESS, and hydrogen production system) in the winter during the day, and method in Example 2 (e.g., priority order of POI, hydrogen production system and ESS) in the summer during the day. This may be beneficial where it is important to charge the ESS as much as possible during shorter winter days, and switch the emphasis to hydrogen production in the summer when full charging of the ESS may be assured.

Figure 5:
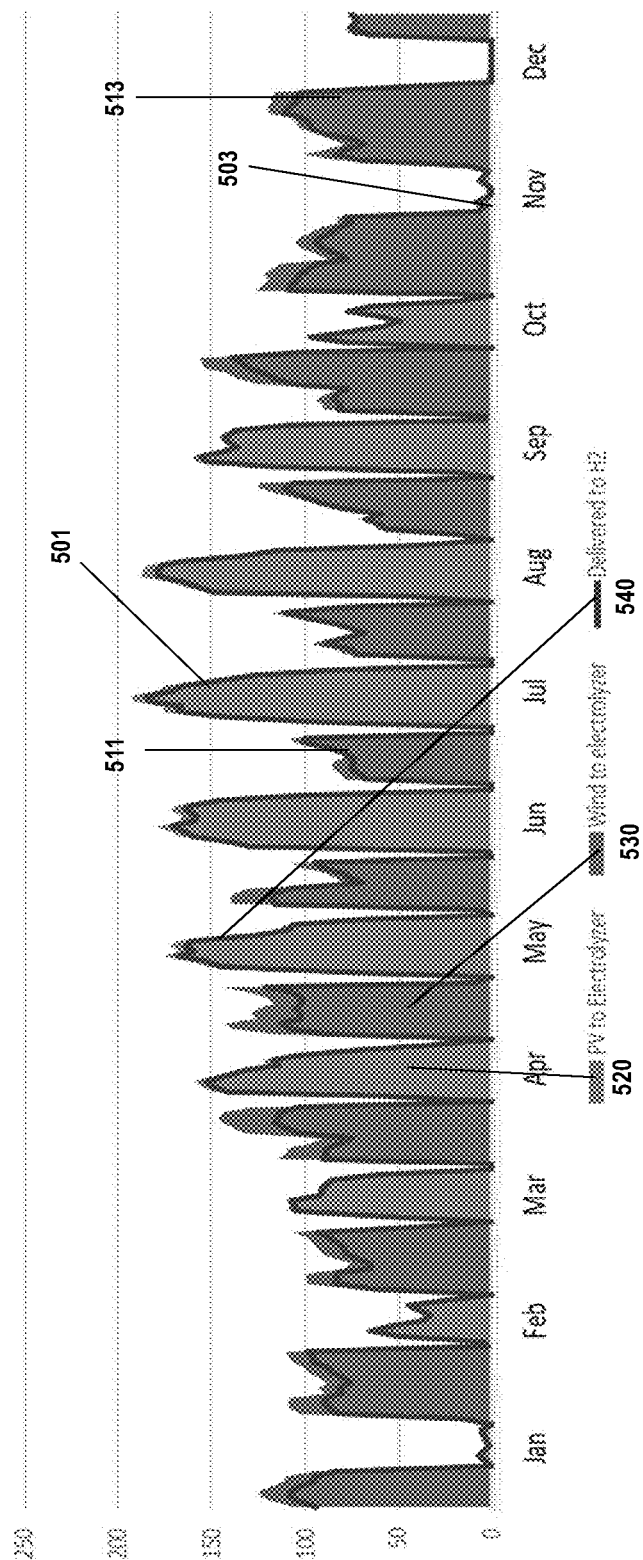
FIG. 5 shows an example of a combination of methods.

FIG. 5 shows an example of combining the methods in Example 1 (e.g., priority order of POI, ESS, and hydrogen production system) and Example 10 (e.g., priority order of hydrogen production system, ESS, and POI). In this example, the power flows into the hydrogen production system. The 12×24 graph shows a powerplant that has local solar production and, in addition, access to wind power through the power grid. During the day, method in Example 1 is adopted. The PV to electrolyzer areas 520 of the graph show the resulting seasonal pattern of daytime power flow to the hydrogen production system, with the most power flow during summer days 501 and little or no power flow 503 to the hydrogen production system during the winter.

During the night, the method in Example 8 (e.g., priority order of hydrogen production system, ESS, and POI) is used. In this case, wind power is used to produce hydrogen as its highest priority. This results in wind power being directed to the hydrogen production system as shown by the wind to electrolyzer areas 530 of the graph. The least amount of wind power flow comes during the summer days 511, with the most power flow during the winter days 513. The solid shaped line going through areas 520 and 530 indicates the power flow to a hydrogen production system 540 over the seasonal patterns illustrated in the graph.

Such combination of methods may beneficially increase the capacity factor of the electrolyzer. As shown in the example, the capacity factor of the electrolyzer is increased from approximately 18% with a solar-only configuration (Example 1) to approximately 40% with the solar-plus-wind configuration.

Methods and systems herein may also allocate the energy regenerated by the renewable resources or the energy discharged from a storage system. The methods as described above (e.g., opportunity cost method, priority order method, etc.) and the combinations thereof can be applied to various use cases. For instance, methods and systems herein may also be capable of allocating power discharged from the ESS to multiple loads or use of energy. For instance, energy stored in the ESS may be allocated between the hydrogen production system and the POI. The energy stored in the ESS may be allocated using the opportunity cost/price method, based on the fulfillment of contractual obligations (of the POI), based on a minimum amount schedule for power and energy deliveries to the POI, prioritizing hydrogen production subject to a limitation of the power flowing into the electrolyzer, or subject to a schedule of the hydrogen production, various other limitations, or any combination of the above.

In some embodiments, the energy stored in the ESS may be allocated using the opportunity cost/price method. For example, energy may be sent to the use or load having highest opportunity cost/price of energy for as long as there is energy stored in the ESS. In the case when energy stored in the ESS has the highest opportunity cost/price, energy may not be discharged from the ESS for that time interval. The opportunity cost/price method can be the same as the opportunity cost/price method as described above.

In some embodiments, energy may be allocated by prioritizing POI. The energy discharged from the ESS may be allocated among multiple loads prioritizing the POI while meeting certain limitation of the ESS. For instance, the ESS may be discharged so that power and energy delivered to the POI meet the contractual obligation to the greatest possible extent, while ensuring there is energy stored in the ESS. The discharge of ESS may also take into account the energy forecast of the RES (and remote RES) so that even the solar and/or wind production may otherwise fail to meet the schedule during at least some parts of the forecast horizon (in a future time interval), the schedule can still be met to the greatest possible extent by the ESS.

This approach may incorporate a forecasting method or mechanism as described elsewhere herein that enables forecasting of whether energy stored in the ESS will be more than what is needed to meet the obligations, given projected solar energy production. In such cases, excess stored energy may optionally be deployed to produce hydrogen.

In some cases, instead of or in addition to contractual obligations, the ESS may have other power or energy limitations. For example, the powerplant may have schedule for power and energy deliveries to the POI, and the ESS is controlled to discharge the energy based at least in part on the schedule. For instance, the ESS may be discharged so that power and energy delivered to the POI meet the schedule to the greatest possible extent, while ensuring there is energy stored in the ESS. The discharge of ESS may also take into account the energy forecast of the RES (and remote RES) so that even the solar and/or wind production may otherwise fail to meet the schedule during at least some parts of the forecast horizon, the schedule can be met to the greatest possible extent by the ESS. Similarly, a forecast mechanism may be incorporated into the system that enables forecasting of whether energy stored in the ESS will be more than what is needed to meet the schedule, given projected solar energy production. In some cases, excess stored energy may optionally be deployed to produce hydrogen.

In some embodiments, energy may be allocated by prioritizing hydrogen production. The energy discharged from the ESS may be allocated among multiple loads prioritizing the hydrogen production while meeting certain limitation of the hydrogen production system and/or the ESS. Methods herein can easily adapt to various requirements or limitations of the powerplant. For example, based on the electrolyzer technologies employed by the hydrogen production system, it may require that special procedures be adopted if the power flow to the electrolyzer falls below a threshold level. For instance, the ESS may be discharged as needed to ensure that power flowing to the electrolyzer is not less than a threshold amount (e.g., minimum threshold), while ensuring there is energy stored in the ESS.

In some cases, the above method may incorporate a forecasting methodology that enables forecasting of whether energy stored in the ESS will be more than what is needed to ensure the minimum required power flow to the electrolyzer, given projected solar energy production. In some case, the excess stored energy may optionally be deployed either to the POI (subject to the requirements of meeting a schedule or complying with contractual obligations, if available) or may be deployed to produce hydrogen.

In some cases, the limitation of the hydrogen production system may be a target value for the power flowing to the electrolyzer. For instance, the ESS is discharged as needed to ensure that the power flowing to the electrolyzer is equal to a target value (e.g., a value close to or approximately the maximum allowed power to the electrolyzer, or a lower value), while ensuring there is energy stored in the ESS. Depending on the size of the ESS, such method may beneficially support operation of the electrolyzer at a high capacity factor. In some cases, such method may further take into account provisions to ensure that the ramp rates (e.g., up and/or down rate) of power flowing into the electrolyzer fall within acceptable ranges.

In some cases, the above method may incorporate a forecasting methodology that enables forecasting of whether energy stored in the ESS will be more than is what needed to ensure the target power flow to the electrolyzer, given projected solar energy production. In some case, the excess stored energy may optionally be deployed either to the POI (subject to the requirements of meeting a schedule or complying with contractual obligations, if available) or may be deployed to produce hydrogen.

The method and system herein can be applied flexibly to various (complicated) limitations of the powerplant. For instance, the method may comprise determining the projected solar energy production during a forecast period (such as by a forecast mechanism), controlling the ESS to discharge such that the power flow to the electrolyzer can meet a predetermined schedule with an acceptable probability level, while ensuring there is energy stored in the ESS. In some cases, the method may also take into account provisions to ensure that the ramp rates (e.g., up and/or down) of power flowing into the electrolyzer fall within acceptable ranges. The method herein may beneficially support operation of the electrolyzer to produce hydrogen on a production schedule (e.g., a production schedule designed to ensure that any minimum input power requirement is met), through the forecast horizon.

For example, the hydrogen production system may have a requirement including a schedule of target values to meet as well as a minimum threshold value to meet. In such cases, the method may comprise determining the projected solar energy production during a forecast period (such as by a forecast mechanism), controlling the ESS to discharge such that at least a minimum power flow to the electrolyzer can be assured at all times during the forecast period, controlling the electrolyzer to operate at a target value (e.g., a value close to the maximum allowed power to the electrolyzer) for at least a portion of the forecast period, while ensuring there is energy stored in the ESS. In some cases, the above method may take into account provisions to ensure that the ramp rates (e.g., up and/or down) of power flowing into the electrolyzer fall within acceptable ranges. Such method may beneficially support operation of the electrolyzer at a high capacity factor, while ensuring that any minimum input power requirement is met through the forecast horizon.

It should be noted that the above use applications, scenarios and examples are for illustration purposes only and are not intended to be limiting. The energy allocation methods and systems herein can be applied to a powerplant with various configurations (e.g., may or may not have second RES, may or may not have ESS, etc.), various use of energy, different relationships among the electric loads (e.g., partially correlated, unrelated), and various power/energy limitations. For example, although the method is described with respect to ESS, the powerplant is not required to have the ESS. For instance, the method may be applied to a solar powerplant dedicated to producing hydrogen, but with the option to reduce or stop hydrogen production in favor of delivering the solar power to the grid, when energy prices are high on the grid. In another example, although the hydrogen production system is illustrated as a use of energy, it can be part of the energy storage system (ESS). For instance, hydrogen production can be both a second use of power, and part of the energy storage system associated with the power plant. In this case, the ESS may have both a battery energy storage system and a hydrogen energy storage system (which is capable of, for example, converting electrical energy and water into hydrogen through electrolysis, storing the hydrogen, and then oxidizing the hydrogen in a power plant to produce electrical energy). This may provide additional benefits as batteries may store/release energy efficiently on a daily cycle while hydrogen energy storage system may be able to hold relatively large amounts of energy for long periods of time.

In some embodiments, the systems herein may comprise an energy management system (EMS), an energy forecasting and allocation system (EFAS) or energy forecasting mechanism. In some embodiments, the EMS or the EFAS may implement one or more methods or operations of the methods as described above. The system may comprise a controller implementing the methods described herein and at least part of the EFAS or the EMS may be implemented by the controller or is in communication with the controller.

The energy management system (EMS) may be configured to direct electrical power from the RES to one or more electric loads, from the RES to the ESS, or from the ESS to the one or more electric loads. The EFAS may be configured to forecast an amount of electrical power available from the RES and the ESS for a plurality of time periods. The EFAS can further be configured to allocate, for each of the plurality of time periods, energy to the electric loads implementing the methods as described above. The plurality of time periods together can comprise a forecast period. Each of the plurality of time periods can be about 1, 2, 3, 4, 5, 6, 7, 8, 9, 10, 15, 20, 25, 30, 35, 40, 45, 50, 55, or 60 minutes or more. In addition, the time periods can be about 1, 2, 3, 4, 5, 6, 7, 8, 9, 10, 11, 12, 13, 14, 15, 16, 17, 18, 19, 20, 21, 22, 23, or 24 hours or more. In addition, the time periods can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days or more. Each of the time periods in a forecast period may be equal in length, or they may have differing durations. As an example, for a renewable powerplant comprising a solar PV RES, a forecast period could end at a next time point at which total consumer power demand from one or more consumer loads is less than the instantaneous electrical power generation from the solar PV RES, after having been more than the instantaneous electrical power generation from the solar PV RES for at least a minimum length of time (e.g., three hours, six hours, nine hours). This point in time could mark a point where the ESS would reach a state of charge at, or near, its minimum charge limit.

The energy allocations may also be based on a forecast of energy production of the RES, the energy consumptions of the one or more electric loads and the like. For example, the forecasts may be based on historical consumption patterns or physical models. The forecasts may also be based on data comprising information about days of the week, time of the year, and weather conditions including temperature, cloud coverage, rain, snow, etc. In some cases, the forecast may be based on a forecast of the weather which influences the capability of the renewable energy sources. For example, the system may store pre-determined relationship about how weather influences on renewable generation and the forecast of the weather may be translated into the power capacity or the production of the RES.

The EFAS can also provide a user interface for a user or operator of the powerplant to modify, configure or set up one or more of the methods, parameters, priority order, and the like for the energy allocation. For example, the user interface may permit a user to modify the order of priority, define the allocation between selected components (e.g., designate fixed allocation ratio between selected loads), change the method for determining the maximum value, change the limitations of the powerplant, manually trigger a performance of one or more operations, and various other aspects of the method or operational parameters of the system. For instance, the user interface may display one or more methods (retrieved from a library) for an operator to change or select for maximizing the forecasted value of power delivered to the multiple loads or uses. The operator may, for example, choose the order of priority by periodically applying an opportunity cost method to assign priority in descending order of opportunity cost, then the operator may apply the order of priority method until the next application of the opportunity cost method.

Computer Systems

Figure 6:
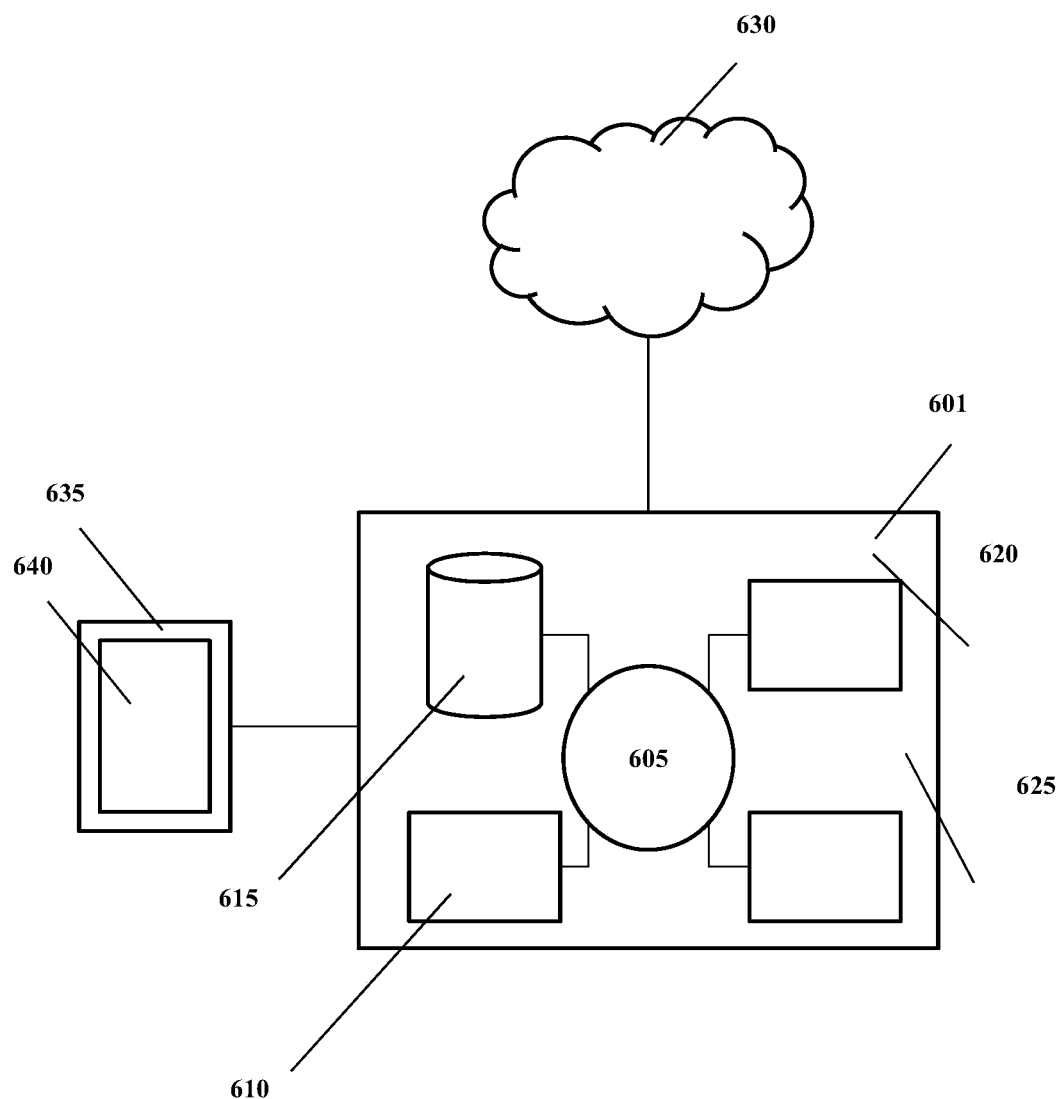
FIG. 6 shows a computer system that is programmed or otherwise configured to regulate electric power plants.

The present disclosure provides computer systems that are programmed to implement methods of the disclosure. FIG. 6 shows a computer system 601 that is programmed or otherwise configured to regulate electric power plants. The computer system 601 can regulate various aspects of the present disclosure, such as, for example, the methods of FIGS. 2-5. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network (network) 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc., shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, a representation of a control of a power plant. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, be an implementation of the pseudocode found in FIGS. 2-5.

The following examples are illustrative of certain systems and methods described herein and are not intended to be limiting.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

What is claimed is:

1. A system for serving two or more uncorrelated loads connected to a renewable energy power plant, wherein the renewable energy power plant comprises a first renewable energy system (RES) configured to generate electrical power from a renewable energy source and an energy storage system (ESS) configured to store energy from the first RES or a power grid, the system comprising:
   a controller communicatively coupled to the first RES, the ESS, the power grid, and one or more industrial processes, wherein the controller is programmed to:
   i). prioritize (1) the ESS, (2) the power grid, and (3) the one or more industrial processes, wherein the prioritization is based on a comparison of cost values determined for each of (1) the ESS, (2) the power grid, and (3) the one or more industrial processes based on (1) a state of charge of the ESS, (2) one or more metrics related to energy or power requirements of the power grid, and (3) one or more metrics related to energy or power requirements of the one or more industrial processes; and
   ii). deliver the electrical power generated by the first RES to at least one of (1) the ESS, (2) the power grid, or (3) the one or more industrial processes based on the prioritization by:
      delivering the electrical power generated by the first RES to the one or more industrial processes up to a power limit of the one or more industrial processes;
         wherein the first RES generates excess electrical power above the power limit of the one or more industrial processes,
      delivering the excess electrical power to charge the ESS if the ESS is not full and is not discharging to the power grid;
      delivering the excess electrical power to the power grid if the ESS is full and not discharging to the power grid; and
      reducing a rate of discharge of the ESS to the power grid if the ESS is discharging to the power grid.

2. The system of claim 1, wherein the controller is programmed to forecast a total energy generation by the first RES for a time period selected from a plurality of time periods and wherein the controller is further configured to determine the electrical power to be delivered to the ESS, the power grid, and the one or more industrial processes based on the forecasted total energy generation by the first RES.

3. The system of claim 1, further comprising a second RES.

4. The system of claim 3, wherein the ESS is configured to be charged by the second RES.

5. The system of claim 3, wherein the controller is communicatively coupled to the second RES, and wherein the controller is further configured to: deliver electrical power generated by the second RES to (1) the ESS, (2) the power grid, and (3) the one or more industrial processes based on the prioritization in (i).

6. The system of claim 5, wherein the controller is configured to forecast a total energy generation by the second RES for a time period selected from a plurality of time periods.

7. The system of claim 6, wherein the controller is further configured to determine the electrical power to be delivered to the ESS, the power grid, and the one or more industrial processes based on the forecasted total energy generation by the second RES.

8. The system of claim 6, wherein the prioritization is performed for each time period in a plurality of time periods.

9. The system of claim 1, wherein if delivering all energy generated by the first RES to the one or more industrial processes as a highest prioritized of: (1) the ESS, (2) the power grid, and (3) the one or more industrial processes is not possible because a maximum energy or power limit of the one or more industrial processes has been reached, the controller is then configured or programmed to deliver excess energy from the first ESS exceeding the maximum energy or power limit of the one of more industrial processes to a second highest prioritized of: (1) the ESS, (2) the power grid, and (3) the one or more industrial processes and repeat the operation until no energy from the first RES is left.

10. The system of claim 1, wherein the one or more industrial processes comprises one or more of the following: hydrogen generation through electrolysis, ammonia production, metal smelting, cryptocurrency mining, data center operation, vertical farming, food production, water purification, atmospheric water generation, direct carbon capture/direct air capture, or glass production.

11. A system for serving two or more uncorrelated loads connected to a renewable energy power plant comprising a first renewable energy system (RES) configured to generate electrical power from a renewable energy source, and an energy storage system (ESS) configured to store energy from the first RES or a power grid, wherein the two or more uncorrelated loads comprise the power grid and one or more industrial processes, the system comprising:
   a second RES; and
   a controller communicatively coupled to the first RES, the second RES, the ESS, the power grid, and the one or more industrial processes, wherein the controller is programmed to:
     i). determine a cost value for each of the power grid, the ESS, and the one or more industrial processes based on (1) power grid contractual obligations, (2) scheduled power grid requirements, (3) contractual obligations with the one or more industrial processes, or (4) scheduled energy requirements for the one or more industrial processes;
     ii). prioritize (1) the power grid, and (2) the one or more industrial processes based on a comparison of the cost values of the power grid, the ESS, and the one or more industrial processes; and
     iii). deliver power stored in the ESS to at least one of (1) the power grid or (2) the one or more industrial processes based on the prioritization.

12. The system of claim 11, wherein the controller is configured to forecast a charge/discharge schedule for the ESS for a time period selected from a plurality of time periods.

13. The system of claim 12, wherein the controller is further configured to determine the electrical power to be delivered to the ESS, the power grid and the one or more industrial processes based on the forecasted charge/discharge schedule for the ESS.

14. The system of claim 11, wherein the ESS is configured to be charged by the second RES.

15. The system of claim 11, wherein the prioritization is performed a plurality of times throughout a plurality of time periods.

16. The system of claim 11, wherein if delivering all available energy from the ESS to the one or more industrial processes is not possible because a maximum energy or power limit of the one or more industrial processes has been reached, the controller is then configured or programmed to deliver excess energy exceeding the maximum energy or power limit of the one or more industrial processes to the power grid until no energy from the ESS is left.

17. The system of claim 11, wherein the one or more industrial processes comprises one or more of the following: hydrogen generation through electrolysis, ammonia production, metal smelting, cryptocurrency mining, data center operation, vertical farming, food production, atmospheric water generation, water purification, direct carbon capture/direct air capture or glass production.

18. A method for allocating energy generated by a renewable energy plant comprising a first renewable energy system (RES), an energy storage system (ESS), a power grid, and one or more industrial processes, the method comprising:
   forecasting a total energy generation by the first RES for a time period selected from a plurality of time periods;
   prioritizing (1) the ESS, (2) the power grid, and (3) the one or more industrial processes, wherein the prioritization is based on a comparison of cost values determined for each of (1) the ESS, (2) the power grid, and (3) the one or more industrial processes based on (1) a state of charge of the ESS, (2) one or more limits related to energy requirements of the power grid, and (3) one or more limits related to energy requirements of the one or more industrial processes; and
   delivering power generated by the first RES to at least one of (1) the ESS, (2) the power grid, or (3) the one or more industrial processes for the selected time period based on the prioritization and the forecast total energy generation by the first RES.

19. The method of claim 18, further comprising: determining the power to be delivered to the ESS, the power grid, and the one or more industrial processes based on the forecasted total energy generation by the first RES.

20. A method for allocating energy generated by a renewable energy plant comprising a first renewable energy system (RES), an energy storage system (ESS), a power grid, a second RES, and one or more industrial processes, the method comprising:
   forecasting a charge/discharge schedule for the ESS for a time period selected from a plurality of time periods;
   determining a cost value for each of the power grid, the ESS, and the one or more industrial processes based on (1) power grid contractual obligations, (2) scheduled power grid requirements, (3) contractual obligations with the one or more industrial processes, or (4) scheduled energy requirements for the one or more industrial processes;
   prioritizing (1) the power grid, and (2) the one or more industrial processes based on a comparison of the cost values of the power grid, the ESS, and the one or more industrial processes; and
   delivering power stored in the ESS to at least one of (1) the power grid or (2) the one or more industrial processes based on the prioritization.

21. The method of claim 20, further comprising: determining power to be delivered to the ESS, the power grid, and the one or more industrial processes based on the forecasted charge/discharge schedule for the ESS.

22. The method of claim 20, wherein the prioritization further comprises determining a ratio for allocating an amount of total energy generation by the first RES and/or the second RES between at least two items of (1) the ESS, (2) the power grid, and (3) the one or more industrial processes.

23. The method of claim 22, wherein the at least two items are less prioritized over another item.

24. The method of claim 20, wherein the one or more industrial processes are connected to the power grid and directly served by the power grid.

25. The method of claim 24, wherein power sent to the power grid by the first RES, the second RES, and/or the ESS and power drawn from the power grid by the one or more industrial processes are substantially instantaneously matched.

\* \* \* \* \*